United States Patent
Ahn et al.

(10) Patent No.: US 10,231,121 B2
(45) Date of Patent: Mar. 12, 2019

(54) SECURITY COMMUNICATION USING POLAR CODE SCHEME

(71) Applicant: LG ELECTRONICS INC., Seoul (KR)

(72) Inventors: Joonkui Ahn, Seoul (KR); Ilmin Kim, Seoul (KR); Kijun Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 15/191,158

(22) Filed: Jun. 23, 2016

(65) Prior Publication Data

US 2016/0380763 A1    Dec. 29, 2016

Related U.S. Application Data

(60) Provisional application No. 62/184,228, filed on Jun. 24, 2015.

(51) Int. Cl.
*H04L 29/06* (2006.01)
*H04W 12/02* (2009.01)
*H04L 9/08* (2006.01)

(52) U.S. Cl.
CPC .......... *H04W 12/02* (2013.01); *H04L 9/0875* (2013.01); *H04L 63/0428* (2013.01); *H04L 63/1475* (2013.01); *H04L 2209/34* (2013.01); *H04L 2209/80* (2013.01)

(58) Field of Classification Search
CPC ............. H04L 63/0428; H04L 63/1475; H04L 9/0875; H04L 2209/34; H04L 2209/80; H04W 12/02
See application file for complete search history.

(56) References Cited

U.S. PATENT DOCUMENTS

| 8,347,186 | B1* | 1/2013 | Arikan | H03M 13/13 714/774 |
| 9,628,114 | B2* | 4/2017 | Huang | H03M 13/616 |
| 9,742,440 | B2* | 8/2017 | El-Khamy | H03M 13/6368 |
| 9,768,915 | B2* | 9/2017 | Kim | H04L 1/0061 |
| 9,780,918 | B2* | 10/2017 | Shen | H04L 1/0069 |
| 2014/0019820 | A1* | 1/2014 | Vardy | H03M 13/13 714/752 |
| 2014/0072067 | A1* | 3/2014 | Yu | H04B 7/0417 375/267 |
| 2014/0133587 | A1* | 5/2014 | Yu | H04L 25/00 375/260 |

(Continued)

OTHER PUBLICATIONS

Land et al., "Information Combining," Foundations and Trends in Communications and Information Theory, vol. 1, No. 1, 2006, pp. 1-106 (107 pages provided).

(Continued)

*Primary Examiner* — Eleni A Shiferaw
*Assistant Examiner* — Sher A Khan
(74) *Attorney, Agent, or Firm* — Birch, Stewart, Kolasch & Birch, LLP

(57) ABSTRACT

A method and apparatus for providing a security communication are provided. A device generates an output bit sequence by applying a polar code scheme to an input bit sequence and transmit the output bit sequence to a target receiver. The output bit sequence is generagted based on a double layer polar coding scheme.

16 Claims, 18 Drawing Sheets

(56) References Cited

U.S. PATENT DOCUMENTS

| | | | |
|---|---|---|---|
| 2014/0331083 A1* | 11/2014 | Aliev | G06F 11/108 |
| | | | 714/6.23 |
| 2014/0365842 A1* | 12/2014 | Li | H03M 13/09 |
| | | | 714/752 |
| 2014/0372835 A1* | 12/2014 | Kwon | H04L 1/0045 |
| | | | 714/776 |
| 2015/0049827 A1* | 2/2015 | Bae | H04B 7/0619 |
| | | | 375/267 |
| 2015/0092886 A1* | 4/2015 | Ionita | H04L 25/4917 |
| | | | 375/298 |
| 2015/0349909 A1* | 12/2015 | El-Khamy | H04W 72/0466 |
| | | | 370/335 |
| 2016/0080174 A1* | 3/2016 | Choi | H04L 25/022 |
| | | | 375/316 |
| 2016/0254876 A1* | 9/2016 | Shen | H03M 13/618 |
| | | | 714/776 |
| 2016/0308644 A1* | 10/2016 | Shen | H04L 1/0057 |
| 2016/0335156 A1* | 11/2016 | En Gad | G06F 11/1012 |

OTHER PUBLICATIONS

Liu et al., "Securing Wireless Communications at the Physical Layer," Springer, 2010, pp. 1-396 (402 pages provided).
Mahdavifar et al., "Achieving the Secrecy Capacity of Wiretap Channels Using Polar Codes," IEEE Transactions on Information Theory, vol. 57, No. 10, Oct. 2011, pp. 6428-6443 (16 pages provided).

* cited by examiner

Case 1:

Case 2:

Case 3:

▨ : zeros
▤ : single layer coding
▩ : double layer coding
▦ : random bits

SECURITY COMMUNICATION USING POLAR CODE SCHEME

CROSS-REFERENCE TO RELATED APPLICATIONS

This application claims the benefit of priority of U.S. Provisional application 62/184,228 filed on Jun. 24, 2015, all of which is incorporated by reference in its entirety herein.

BACKGROUND OF THE INVENTION

Field of the Invention

The present invention relates to a wireless communication, and more particularly a method and device for providing a security communication using a polar code.

Related Art

In a data communication system, it should be ensured that data which a sender (Alice) sends is not eavesdropped by a non-intended user (Eve) and is received only by an intended user (Bob) in a secure manner. In this secure communication, conventionally, techniques based on cryptography have been employed. In such cryptography-based techniques, a secret key is used. In this connection, various approaches allow only Alice to be aware of a current secret key, and, thereafter, Alice encrypts data using the current secret key, which, in turn, is sent to Bob. Bob decodes the received data using the current secret key. Although such cryptography-based techniques have been employed by many communication systems for a long time, such cryptography-based techniques require a system for generating/distributing/maintaining the secret key. In some of such systems, a secure generating/distributing/maintaining of the secret key may be very difficult or even impossible. In order to solve this problem, recently, totally different techniques are studied vigorously to provide a communication security, among which there is a physical layer security technique. While the previous cryptography-based techniques provide a security for an upper layer of a communication system, the physical layer security technique provides a security for a physical layer of the communication system. Details about the physical layer security technique are disclosed in a following [Ref 1]:

Ref [1] R. Liu and W Trappe, *Securing wireless communications at the physical layer*, Springer, 2010.

Up to now, the most effective method to substantially provide the communication security based on the physical layer security concept is a polar coding scheme. A method for providing the physical layer security using the polar coding scheme is well disclosed in a following article:

Ref [2] H Mandavifar and A. Vardy, *"Achieving the Secrecy Capacity of Wiretap Channels Using Polar Codes,"* IEEE Transactions on Information Theory, Vol 57, Issue 10, Page(s): 6428-443, October, 2011.

Such a polar coding scheme may be referred to as a "secure polar coding scheme". In the previous method for providing the physical layer security using the polar coding scheme, the coding method is constructed using an assumption that Alice is aware of instantaneous channel information for Bob and Eve. When there is feedback information from Bob to Alice in an actual communication environment, Alice may know the instantaneous channel information for Bob. Especially, it may frequently be case that there is not feedback information from Eve to Alice in an actual communication environment. It may be more reasonable to assume that Alice does not know the instantaneous channel information for Eve. Eventually, in the previous method, when the instantaneous channel information is not known, the secure polar coding scheme may not be available.

SUMMARY OF THE INVENTION

In an aspect, a method for providing a security communication is provided. The method comprises generating an output bit sequence by applying a polar code scheme to an input bit sequence, and transmitting the output bit sequence to a target receiver. The input bit sequence includes a first bits group, a second bits group, a third bits group and a fourth bits group. The first bits group includes bit channels of which mutual information for the target receiver is smaller than a first predetermined value. The second bits group includes bit channels of which the mutual information for the target receiver is greater than the first predetermined value, and the mutual information for the eavesdropper is smaller than a third predetermined value. The third bits group includes bit channels of which the mutual information for the eavesdropper is greater than the third predetermined value, but the mutual information for the eavesdropper is smaller than a fourth predetermined value. The fourth bits group includes bit channels of which the mutual information for the target receiver is greater than a second predetermined value, and the mutual information for an eavesdropper is greater than the fourth predetermined value. The second predetermined value can be set as 1-the first predetermined vale. The fourth predetermined value can be set as 1-the third predetermined vale. And, the output bit sequence is generated by applying a double layer polar coding scheme to the third bits group.

The double layer polar coding scheme may be divided into inner layer encoding scheme and outer layer encoding scheme.

An outer layer of the third bits group may be constructed by the outer layer encoding scheme as follows:

$$\tilde{\pi}(v^{(j)}) = \left[0, \ldots, 0, v_1^{(j)}, \ldots, v_{|I_0^{(j)}|}^{(j)}, *, \ldots, *\right]$$

The j is polar code in the outer layer. The * is a random bit. The v is an input bit vector. The $\pi(v)$ is a sequence of the input bit vectors. The $$\left\{v_1^{(j)}, \ldots, v_{|I_0^{(j)}|}^{(j)}\right\}$$

are secure bits which will be sent by the outer layer encoding scheme. And, the $|I_0^{(j)}|$ is mutual information for the j-th polar code.

A coded bit using the j-the polar code in the outer layer may be mapped with a j-th bit in the bits group corresponding to all of codewords in an inner layer.

An inner layer of the third bits group may be constructed by the inner layer encoding scheme as follows:

$$\pi(u^{(k)}) = [0, \ldots, 0, u_1^{(k)}, \ldots, u_{|I(k)|}^{(k)}, \tilde{u}_k^{(j1)}, \ldots, \tilde{u}_k^{(j|X|)}, *, \ldots, *]$$

The k is polar code in the inner layer. The * is a random bit. The u is an input bit vector. The $\pi(u)$ is a sequence of the input bit vectors. The $u_j^{(k)}$, $j=1, \ldots, |I_k|$ are secure bits which will be sent by the inner layer encoding scheme. And the $|I/_k|$ is mutual information of the k-th polar code.

The output bit sequence may be generated by applying a single layer polar coding scheme to the second bits group.

The input bit sequence may be arranged by the mutual information in increasing order.

In another aspect, a device for providing a security communication is provided. The device comprises a transceiver configured to transmit and receive radio signals, and a processor operatively coupled with the transceiver. The processor is configured to generate an output bit sequence by applying a polar code scheme to an input bit sequence, and control the transceiver to transmit the output bit sequence to a target receiver.

Secure data transmission using a polar coding scheme can be provided. Data to be transmitted can be decoded only by an intended receiver, but cannot be decoded by a non-intended eavesdropper.

DESCRIPTION OF EXEMPLARY EMBODIMENTS

Figure 1:
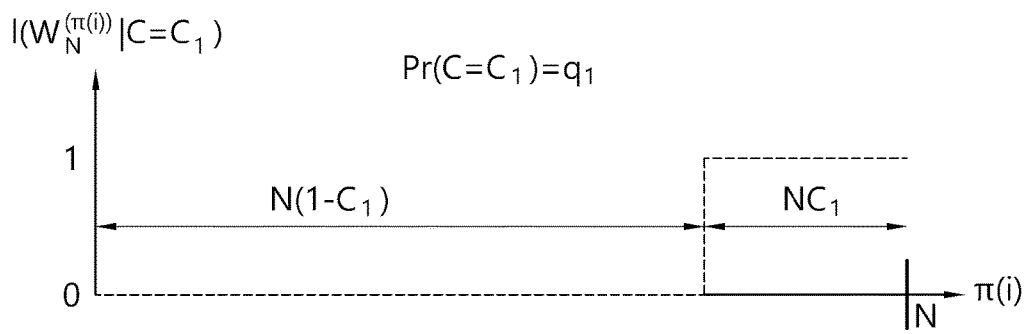
FIG. 1 illustrates average mutual information of each bit channel in the polar coding scheme when using varying channels.
Figure 1:
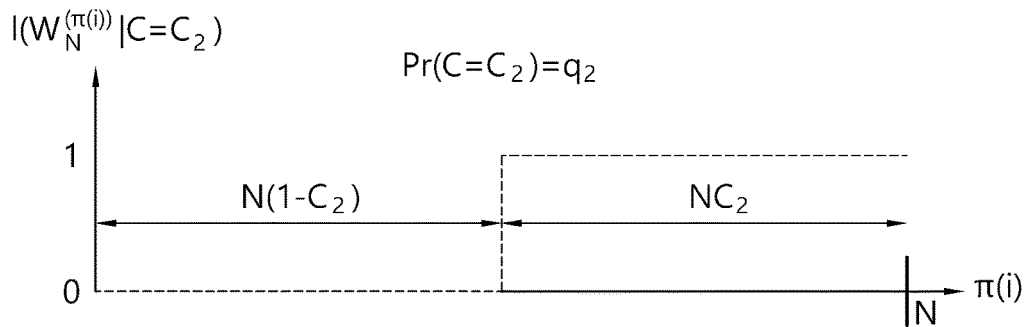
Figure 1:
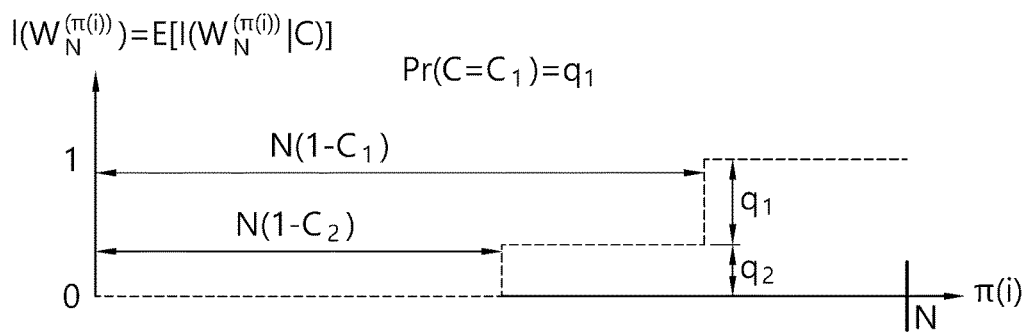

The present invention provides a communication system constructed to allow secure data transmission using a polar coding scheme. In particular, with consideration of a situation where channel information for an eavesdropper is not accurately known to a sender, the system is constructed to ensure that data to be transmitted is decoded only by an intended receiver with a minimum error probability, but is not decoded by a non-intended eavesdropper. To this end, the present invention provides double layer secure polar coding scheme, interleaved single layer secure polar coding scheme, and/or interleaved double layer secure polar coding schemes, and a Hybrid Automatic Repeat Request (hereinafter, HARQ) scheme based on the secure polar coding scheme.

1. Previous Secure Polar Coding Scheme

The conventional secure polar coding scheme has been described in details in the above [Ref 2]. Herein, the concept thereof will be described briefly. A polar code has been recently developed and satisfies a binary input channel capacity, and it is the first case to mathematically prove that the binary input channel capacity is satisfied. The polar code is made on the foundation that if a polar code generator matrix is used to transmit information bits, they are separate into bit channels not having errors and bit channels always having errors because the length of a code is long. It is called channel polarization. For this reason, desired information is transmitted to the bit channels not having errors and predetermined values are transmitted to bit channels always having errors.

The polar code with a length N is constructed as follows: "Z" refers to a set of bits in advance known to Alice and Bob. In the above document, such bits are referred to as "frozen bits". Generally, a zero value is employed as all of the frozen bits. It is assumed that the frozen bits are known to Eve. "I" refers to a set of information bits to be intended to be sent from Alice to Bob using a secure communication. "R" refers to a set of random bits which are randomly generated by Alice. The random bits do not contain any information. The random bits are not known to both Bob and Eve. The above Z, I, R bits are expressed as follows:

$\mathcal{Z} = \{0, 0, \ldots, 0\}$
$\mathcal{I} = \{u_1, u_2, \ldots, u_{|I|}\}$
$\mathcal{R} = \{*, *, \ldots, *\}$ where * represents a random bit.

In the polar coding scheme, first, a following bit vector $\pi(u)$ is constructed:

$$\pi(u) = \left[\underbrace{0, \ldots, 0}_{|Z|}, \underbrace{u_1, \ldots, u_{|I|}}_{|I|}, \underbrace{*, \ldots, *}_{|R|}\right]$$

where $|Z|+|I|+|R|=N$. The bit vector $\pi(u)$ represents an arrangement of input bit vectors in an increasing order of mutual information of each bit channel.

$C_b$ represents a channel capacity between Alice and Bob. $C_e$ represents a channel capacity between Alice and Eve. In order to ensure that the information bits I are decoded only for Bob but not for Eve, a size of each set of the bits should be determined as follows:

$|\mathcal{Z}|=N(1-C_b)$
$|\mathcal{I}|=N(C_b-C_e)$
$|\mathcal{R}|=NC_e$

The input bit vector u of the polar code is found out by taking an inverse function of $\pi(\cdot)$ as follows:

$$u=\pi^{-1}([0, \ldots, 0, u_1, \ldots, u_{|\mathcal{I}|}, *, \ldots, *])$$

When the input bit vector u has been obtained, the vector is multiplied by a polar code generator matrix $G_N$. In this way, an actually-transmitted codeword x is obtained as follows:

$$x=uG_N=[x_1, \ldots, x_N]$$

A transmission rate R of the polar code is obtained as follows:

$$R = \frac{|\mathcal{I}|}{N} = C_b - C_o$$

2. Average Mutual Information

Mathematical results required to offer an actual secure polar coding scheme are provided in this section. It is assumed that $\mathbb{C}$ refers to a random variable representing a channel capacity of a binary input channel.

FIG. 1 illustrates average mutual information of each bit channel in the polar coding scheme when using varying channels.

Referring to FIG. 1, considering data transmission over a wireless fading channel, the channel capacity of the binary input channel is represented by the random variable. It is assumed that $f_{\mathbb{C}}(x)$, $0 \leq x \leq 1$ represents a probability density function of the random variable $\mathbb{C}$. In addition, it is assumed that $F_{\mathbb{C}}(x)$ represents a cumulative distribution function:

$$F_{\mathbb{C}}(x) = \int_0^x f_{\mathbb{C}}(t)dt, \ 0 \leq x \leq 1$$

When the cumulative distribution function $F_{\mathbb{C}}(x)$ is defined, a reversed complementary cumulative distribution function $\tilde{F}_{\mathbb{C}}(x)$ is obtained as follows:

$$\tilde{F}_{\mathbb{C}}(x) = 1 - F_{\mathbb{C}}(1-x), \ 0 \leq x \leq 1$$

$$= Pr(\mathbb{C} \geq 1 - x)$$

Also, a well-known outage probability in the above previous document is equal to the cumulative distribution function for the channel as follows:

$$P_{\mathbb{C}}^{out}(x) = F_{\mathbb{C}}(x)$$

In the polar coding scheme, when the channel capacity C is given, instantaneous mutual information of a $\pi(i)$-th bit channel is represented as $I(W^{(\pi(i))}|C)$, where $\pi(i)$ denotes an index indicating a position of the bit channel when N bit channels of the polar code are arranged in an increasing direction of the mutual information. By taking an average value of the instantaneous mutual information of the $\pi(i)$-th bit channel with respect to the channel probability distribution, average mutual information of the $\pi(i)$-th bit channel is defined as follows:)

$$I(W^{(\pi(i))}) = \mathbb{E}_C[I(W^{(\pi(i))}|C)]$$

When the channel capacity C has a discrete probability distribution with two states, a concept of the average mutual information in the polar coding scheme is shown in FIG. 1.

Via mathematical analysis, the $\pi(i)$-th average mutual information may be expressed mathematically as follows:

$$I(W^{(\pi(i))}) = \tilde{F}_{\mathbb{C}}\left(\frac{\pi(i)}{N}\right), \ \pi(i) = 1, 2, \ldots, N$$

$$= 1 - F_{\mathbb{C}}\left(1 - \frac{\pi(i)}{N}\right)$$

$$= 1 - P_{\mathbb{C}}^{out}\left(1 - \frac{\pi(i)}{N}\right)$$

3. Double Layer Secure Polar Coding Scheme Available when Instantaneous Channel Information of Eve is Unknown It is assumed that a wireless channel refers to a block fading channel. For the block fading channel, a channel is fixed in each channel, and the channels are independent of each other between the different blocks. It is assumed that a length of each block is N, and a total number of the blocks is K. A single polar coded codeword is transmitted for each channel block. A collection of the K polar codewords is subjected to coding once again. It is assumed that N and K are sufficiently large.

3.1 Classification of Bits for Double Layer Secure Polar Decoding Scheme

It is assumed that channels for Bob and Eve are denoted as $\mathbb{C}_b$ and $\mathbb{C}_e$ respectively. It is assumed that probability distribution functions for Bob and Eve are denoted as $f_{\mathbb{C}}^b(x)$ and $f_{\mathbb{C}}^c(x)$ respectively. Using the mathematical results given in the previous section, average mutual information of the $\pi(i)$-th bit channels for Bob and Eve are expressed respectively as follows:

$$I(W_b^{(\pi(i))}) = \mathbb{E}[I(W_b^{(\pi(i))}|\mathbb{C}_b)], \ \pi(i) = 1, 2, \cdots, N$$

$$= \tilde{F}_{\mathbb{C}}^b\left(\frac{\pi(i)}{N}\right)$$

$$= 1 - F_{\mathbb{C}}^b\left(1 - \frac{\pi(i)}{N}\right)$$

$$= 1 - P_{\mathbb{C},Bob}^{out}\left(1 - \frac{\pi(i)}{N}\right)$$

$$I(W_c^{(\pi(i))}) = \mathbb{E}[I(W_c^{(\pi(i))}|\mathbb{C}_c)], \ \pi(i) = 1, 2, \cdots, N$$

$$= \tilde{F}_{\mathbb{C}}^{cb}\left(\frac{\pi(i)}{N}\right)$$

$$= 1 - F_{\mathbb{C}}^c\left(1 - \frac{\pi(i)}{N}\right)$$

$$= 1 - P_{\mathbb{C},Eve}^{out}\left(1 - \frac{\pi(i)}{N}\right)$$

where $$P_{\mathbb{C},Bob}^{out}(x) = F_{\mathbb{C}}^b(x) = \int_0^x f_{\mathbb{C}}^b(t)dt, \ 0 \leq x \leq 1$$

$$P_{\mathbb{C},Eve}^{out}(x) = F_{\mathbb{C}}^c(x) = \int_0^x f_{\mathbb{C}}^c(t)dt, \ 0 \leq x \leq 1$$

In order to transmit information using a physical layer security approach, the channel for Bob should have a better quality than the channel for Eve. Thus, a following is assumed:

$$I(W_b^{(\pi(i))}) \geq I(W_e^{(\pi(i))}), \text{ for all } \pi(i) = 1, \ldots, N$$

Figure 2:
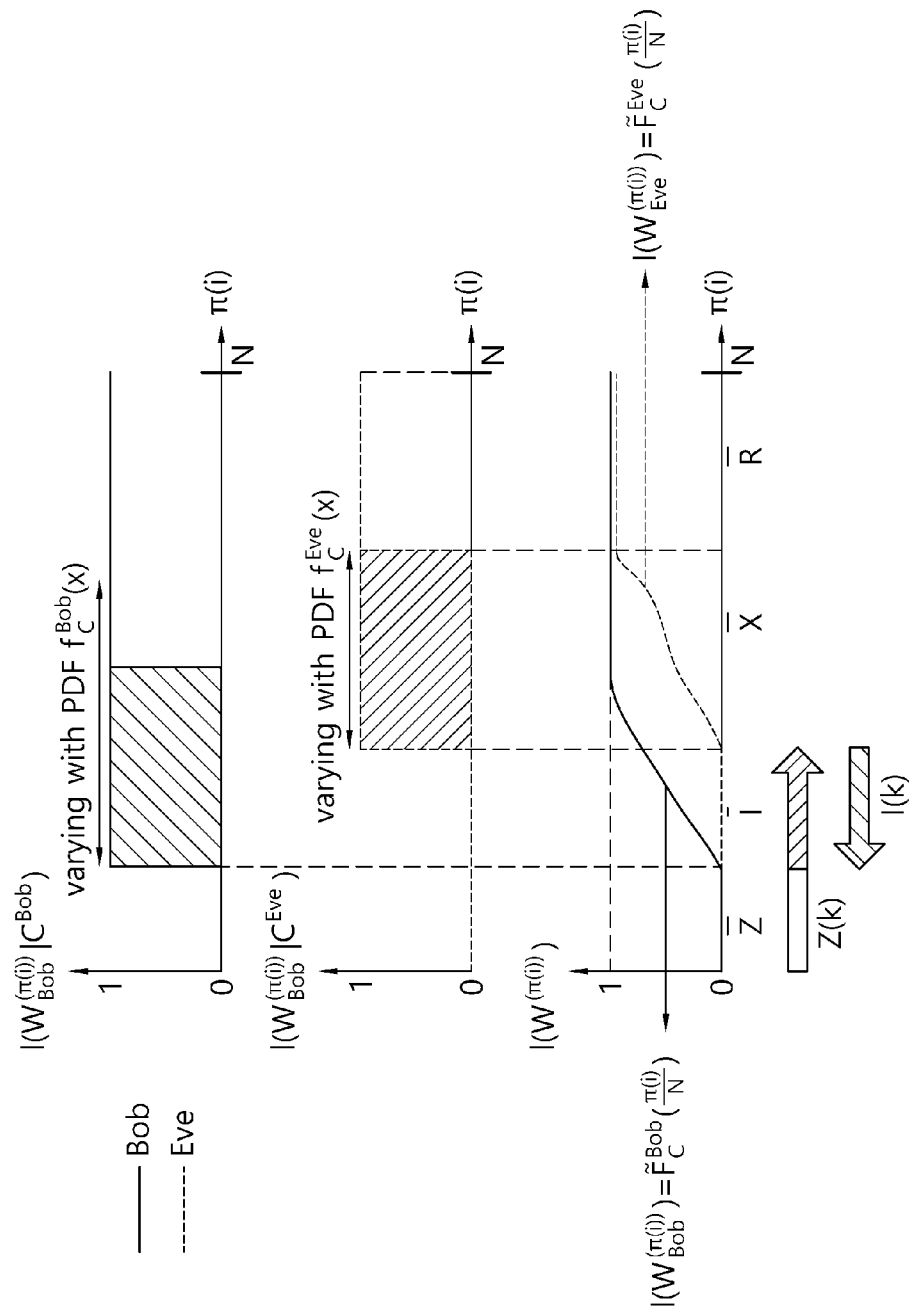
FIG. 2 illustrates identification between bit channels based on the mutual information for Bob and Eve.

FIG. 2 illustrates identification between bit channels based on the mutual information for Bob and Eve.

Referring to FIG. 2, a first case when the instantaneous channel information for Bob is known to Alice, and a second case when the instantaneous channel information for Bob is not known to Alice are considered. In the first case when the instantaneous channel information for Bob is known to Alice, for a k-th fading block, following bits four groups may be considered:

$$\mathcal{E}(k) = \{\pi(i) \in [1,N] : I(W_b^{(\pi(i))} \mathbb{C}_b(k)) < \delta_b\}$$

$$\mathcal{I}(k) = \{\pi(i) \in [1,N] : \delta_b \leq I(W_b^{(\pi(i))} \mathbb{C}_b(k)) \leq 1-\delta_b \text{ and } I(W_e^{(\pi(i))}) < \delta_e\}$$

$$X = \{\pi(i) \in [1,N] : \delta_e \leq I(W_e^{(\pi(i))}) \leq 1-\delta_e\}, \text{ for all } k$$

$$\mathcal{R} = \{\pi(i) \in [1,N] : I(W_e^{(\pi(i))}) > 1-\delta_e\}, \text{ for all } k$$

In the above, $\mathbb{C}_b(k)$ refers to a channel capacity for Bob for the k-th fading block, and is known to Alice using the instantaneous channel information for Bob. In this way, instantaneous mutual information $I(W_b^{(\pi(i))}|\mathbb{C}_b(k))$ for the channel for Bob is known to Alice. However, since the instantaneous channel information for Eve is not known to Alice, instantaneous mutual information $I(W_e^{(\pi(i))}\mathbb{C}_e(k))$ f is not known to Alice. Only average mutual information $I(W_e^{(\pi(i))})$ is known to Alice.

In the second case when the instantaneous channel information for Bob is not known to Alice, for the k-th fading block, following four bits groups may be considered:

$$\vec{\mathcal{Z}} = \{\pi(i) \in [1,N] : I(W_b^{(\pi(i))}) < \delta_b\}, \text{ for all } k$$

$$\vec{\mathcal{I}} = \{\pi(i) \in [1,N] : \delta_b \leq I(W_b^{(\pi(i))}) \leq 1-\delta_b \text{ and } I(W_e^{(\pi(i))}) < \delta_e\}, \text{ for all } k$$

$$\mathcal{X} = \{\pi(i) \in [1,N] : \delta_e \leq I(W_e^{(\pi(i))}) \leq 1-\delta_e\}, \text{ for all } k$$

$$\vec{\mathcal{R}} = \{\pi(i) \in [1,N] : I(W_e^{(\pi(i))}) > 1-\delta_e\}, \text{ for all } k$$

Between the first ans second cases, a following relationship is established:

$$\vec{\mathcal{Z}} = \cap_{k=1}^{K} \mathcal{Z}(k)$$

$$\vec{\mathcal{I}} = \cup_{k=1}^{K} \mathcal{I}(k)$$

Figure 3:
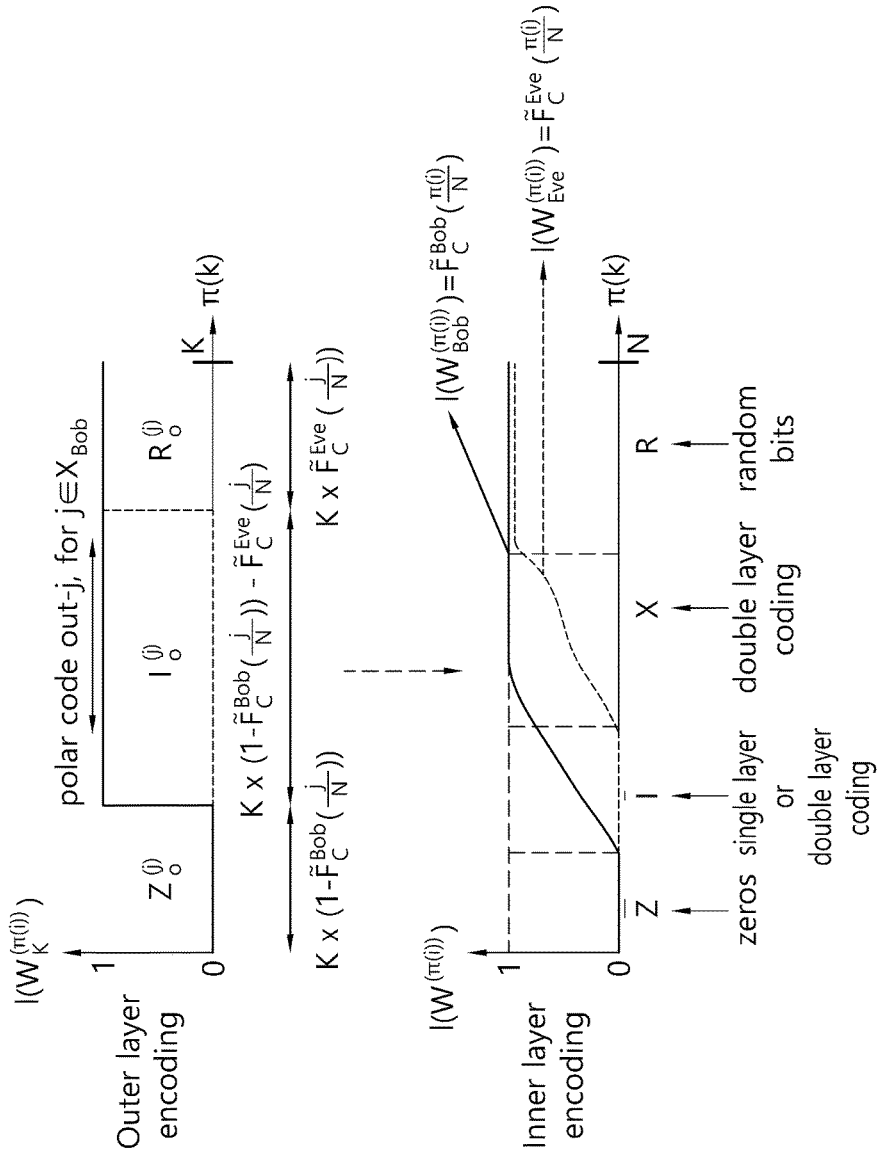
FIG. 3 illustrates a concept of the double layer secure polar coding scheme.

3.2 Double Layer Secure Polar Coding Scheme available when Instantaneous Channel Information for Bob is known In this section, the double layer secure polar coding scheme available when the instantaneous channel information of Bob is known to Alice is set forth. FIG. 3 illustrates a concept of the double layer secure polar coding scheme for a bit belonging to the X bits group.

3.2.1 Double Layer Encoding Scheme

Figure 4:
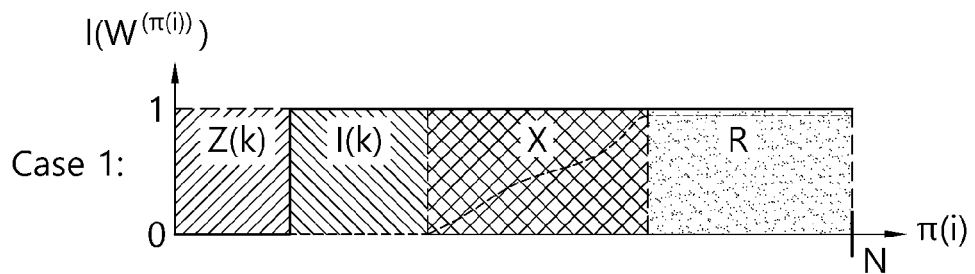
FIGS. 4 and 5 illustrate a concept of the double layer secure polar coding scheme when the instantaneous channel information for Bob is known to Alice.
Figure 4:
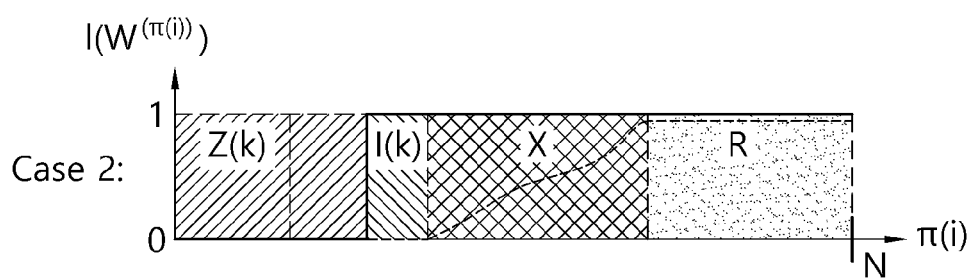
Figure 4:
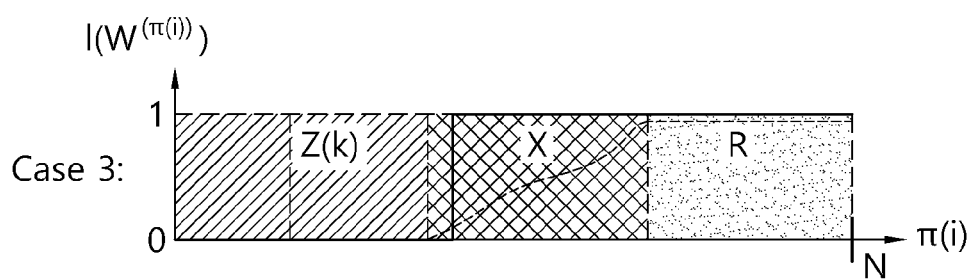
Figure 5:
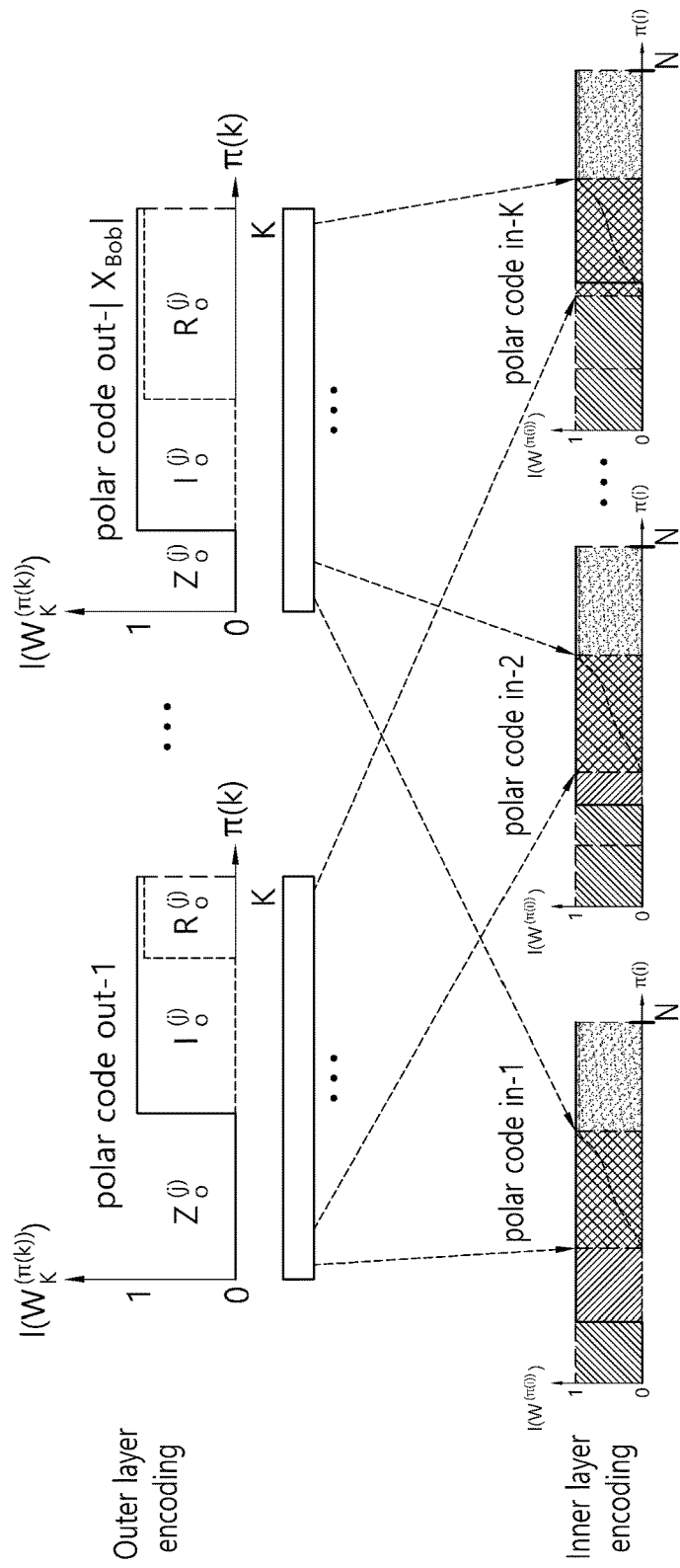

With respect to the four bits groups described above, K polar codewords corresponding to the K fading blocks respetively are constructed using a following encoding scheme. FIG. 4 and FIG. 5 illustrate a concept of the double layer secure polar coding scheme when the instantaneous channel information for Bob is known to Alice:

Z: For all of the K codewords, frozon bits are sent via this bits set.

I(k): For all of the K codewords, secure data is sent via this bits set using the single layer polar coding scheme.

X: For all of the K codewords, secure data is sent via this bits set using the double layer polar coding scheme.

R: For all of the K codewords, random bits are sent via this bits set.

The double layer secure polar coding scheme will be descriebd below in detail wherein the double layer polar coding scheme is divided into outer and inner layer encoding schemes:

Outer layer encoding scheme: a j-th secure polar code in an outer layer is constructed as follows:

$$\tilde{\pi}(v^{(j)}) = [\underbrace{0, \cdots, 0}_{|Z_o^{(j)}|}, \underbrace{v_1^{(j)}, \ldots, v_{|I_o^{(j)}|}^{(j)}}_{|I_o^{(j)}|}, \underbrace{*, \ldots, *}_{|R_o^{(j)}|}], j \in X$$

$$\tilde{u}^{(j)} = v^{(j)} G_K, j \in X$$
$$=: [\tilde{u}_1^{(j)}, \cdots, \tilde{u}_K^{(j)}]$$

where $$\{v_1^{(j)}, \cdots, v_{|I_o^{(j)}|}^{(j)}\}$$

denotes secure bits sent using the double layer endcoding scheme. In the above, a size of each bits group $|Z_0^{(j)}|$, $|I_0^{(j)}|$, $|R_0^{(j)}|$ is defined as follows:

$$|\mathcal{Z}_o^{(j)}| = K(1 - I(W_b^{(j)})) = K\left(1 - \tilde{F}_\mathbb{C}^b\left(\frac{j}{N}\right)\right)$$

$$|\mathcal{I}_o^{(j)}| = K(I(W_b^{(j)}) - I(W_e^{(j)})) = K\left(\tilde{F}_\mathbb{C}^{(j)}\left(\frac{j}{N}\right) - \tilde{F}_\mathbb{C}^c\left(\frac{j}{N}\right)\right)$$

$$|\mathcal{R}_o^{(j)}| = KI(W_o^{(j)}) = K\tilde{F}_\mathbb{C}^c\left(\frac{j}{N}\right)$$

where j=1, . . . , |x|, and $|Z_0^{(j)}|+|I_0^{(j)}|+|R_0^{(j)}|=K$

Mapping between inner and outer layer encoding schemes:

K coded bits using the j-th polar code in the outer layer are mapped with a j-th bit in the X bits group corresponding to all of K codewords in the inner layer.

Figure 6:
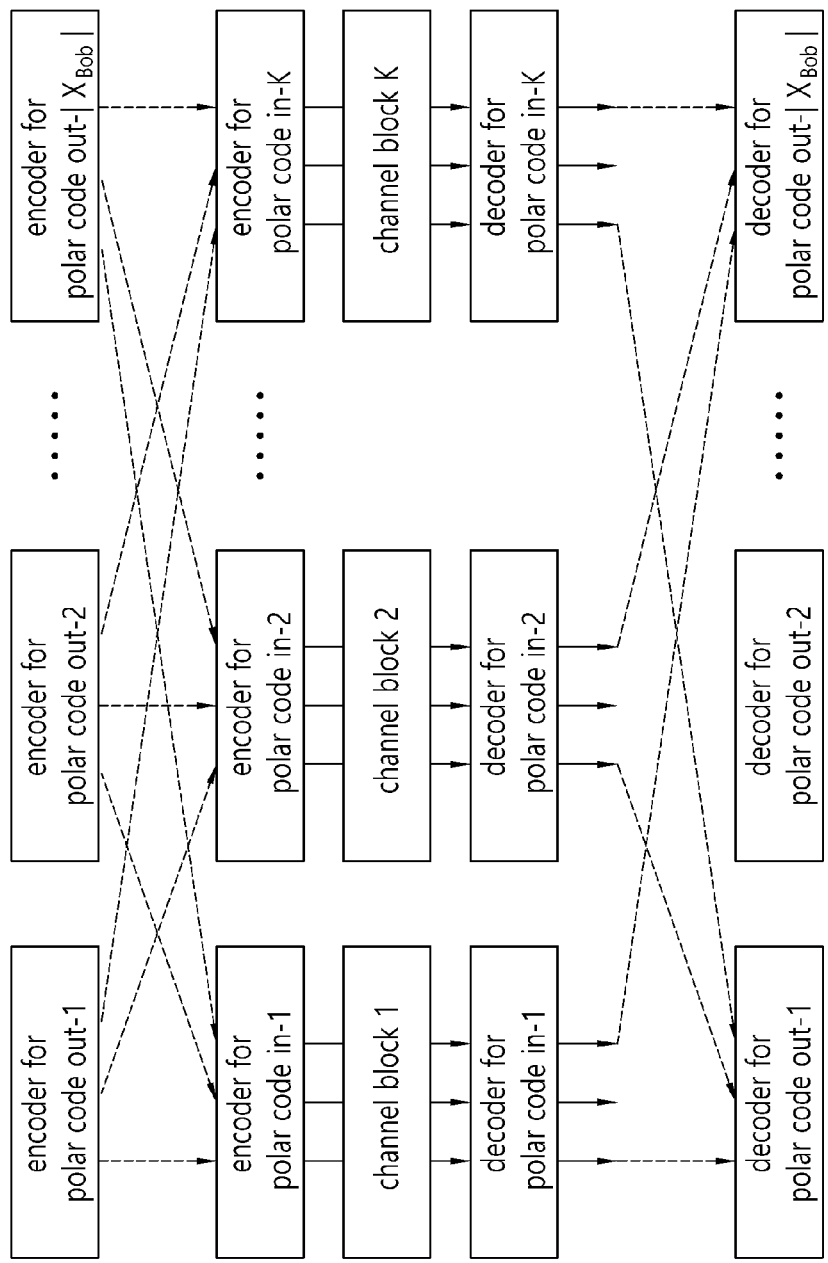
FIG. 6 illustrates a concept of an entire system including the mapping between the inner and outer layer encoding schemes for the double layer secure polar coding scheme.

FIG. 6 illustrates a concept of an entire system including the mapping between the inner and outer layer encoding schemes for the double layer secure polar coding scheme.

Inner layer encoding scheme: a k-th secure polar code in an inner layer is constructed as follows:

$$\pi(u^{(k)}) = [\underbrace{0, \cdots, 0}_{|Z(k)|}, \underbrace{u_1^{(k)}, \cdots, u_{|I(k)|}^{(k)}}_{|I(k)|}, \underbrace{\tilde{u}_k^{(j_1)}, \ldots, \tilde{u}_k^{(j_{|X|})}}_{|X| \text{ for } j_i \in X}, \underbrace{*, \ldots, *}_{|\mathcal{R}|}],$$

for $k = 1, \ldots, K$ $$x^{(k)} = u^{(k)} G_N$$

where $\{u_j^{(k)}: j=1, \ldots, |I_k|\}$ denotes secure bits sent only using the inner layer endcoding scheme.

3.2.2 Double Layer Decoding Scheme

The double layer decoding scheme is configured as follows.

Figure 7:
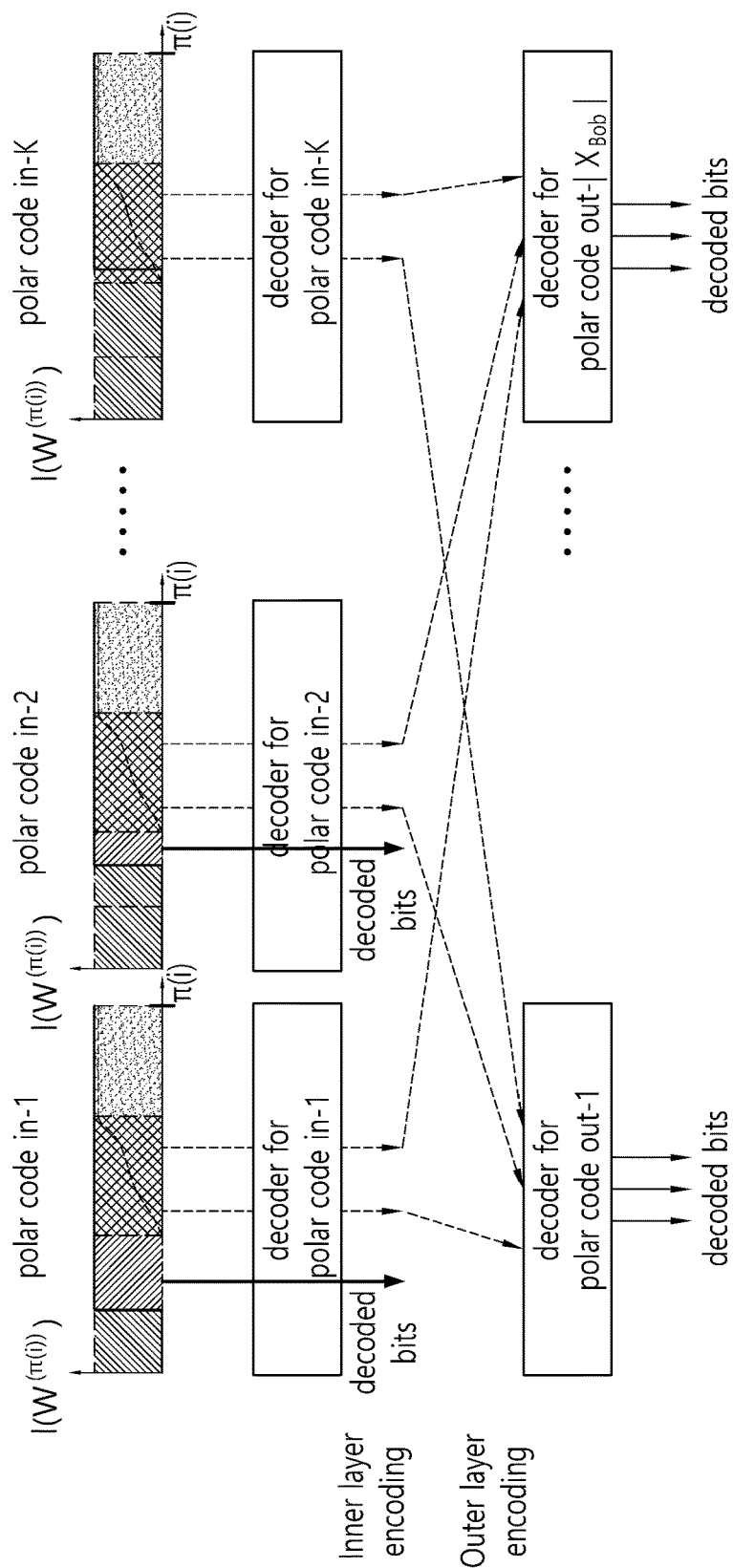
FIG. 7 illustrates a concept of the double layer secure polar decoding scheme when the instantaneous channel information for Bob is known to Alice.

FIG. 7 illustrates a concept of the double layer secure polar decoding scheme when the instantaneous channel information for Bob is known to Alice.

Inner layer coding scheme:

Z(k): The frozen bits in this bits set are used for the inner layer decoding scheme.

I(k): Bits $\{u_j^{(k)}: j=1, \ldots, |I(k)|\}$ belonging to this bits set are directly decoded by a k-th inner decoder.

X: Soft decoding information about bits belonging to this bits set is transmitted to an outer-layer decoder.

R: Bits belonging to this bits set are ignored

Mapping between inner and outer layer decoding schemes:

Soft decoding information about |X| bits belonging to the bits set X for the k-th inner layer decoder is mapped with a k-th bit in the bits set |X| for |X| decoders in the outer layer.

Outer layer decoding scheme:

$Z_0^{(j)}$: The frozen bits in this bits set are used for the inner layer decoding scheme.

$I_0^{(j)}$: The information bits $\{v_k^{(j)}: k=1, \ldots, |I_0|\}$ belonging to this bits set are decoded by a j-th decoder.

$R_0^{(j)}$: The bits belonging to this bits set are ignored.

3.3 Double Layer Secure Polar Coding Scheme Available when Instantaneous Channel Information for Bob is Not Known to Alice In this section, the double layer secure polar coding scheme avaliable when the instantaneous channel information for Bob is not known to Alice is set forth.

3.3.1 Double Layer Encoding Scheme

With respect to the four bits groups or sets described above, K polar codewords corresponding to the K fading blocks respectively are constructed using a following encoding scheme:

Z: For all of the K codewords, frozon bits are sent via this bits set.

I: For all of the K codewords, secure data is sent via this bits set using the double layer polar coding scheme.

X: For all of the K codewords, secure data is via this bits set using the double layer polar coding scheme.

R: For all of the K codewords, random bits are sent via this bits set.

Figure 8:
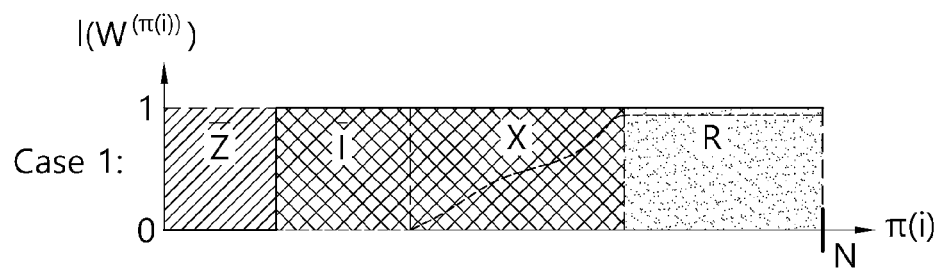
FIGS. 8 and 9 illustrate a concept of the double layer secure polar decoding scheme when the instantaneous channel information for Bob is unknown to Alice.
Figure 8:
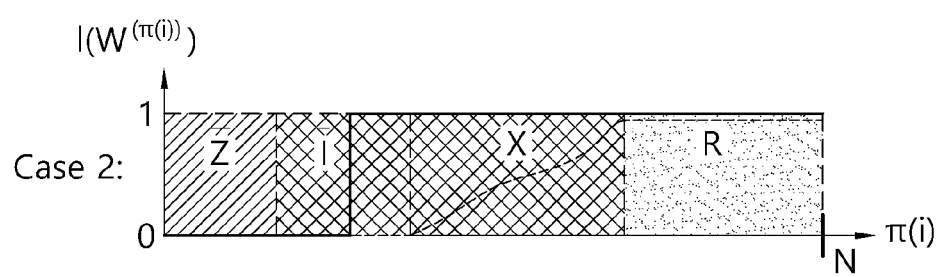
Figure 8:
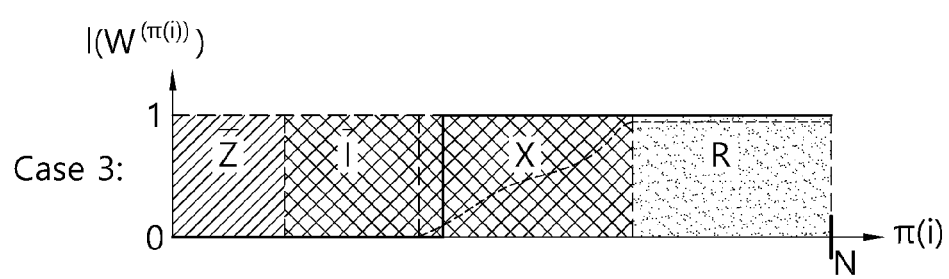
Figure 9:
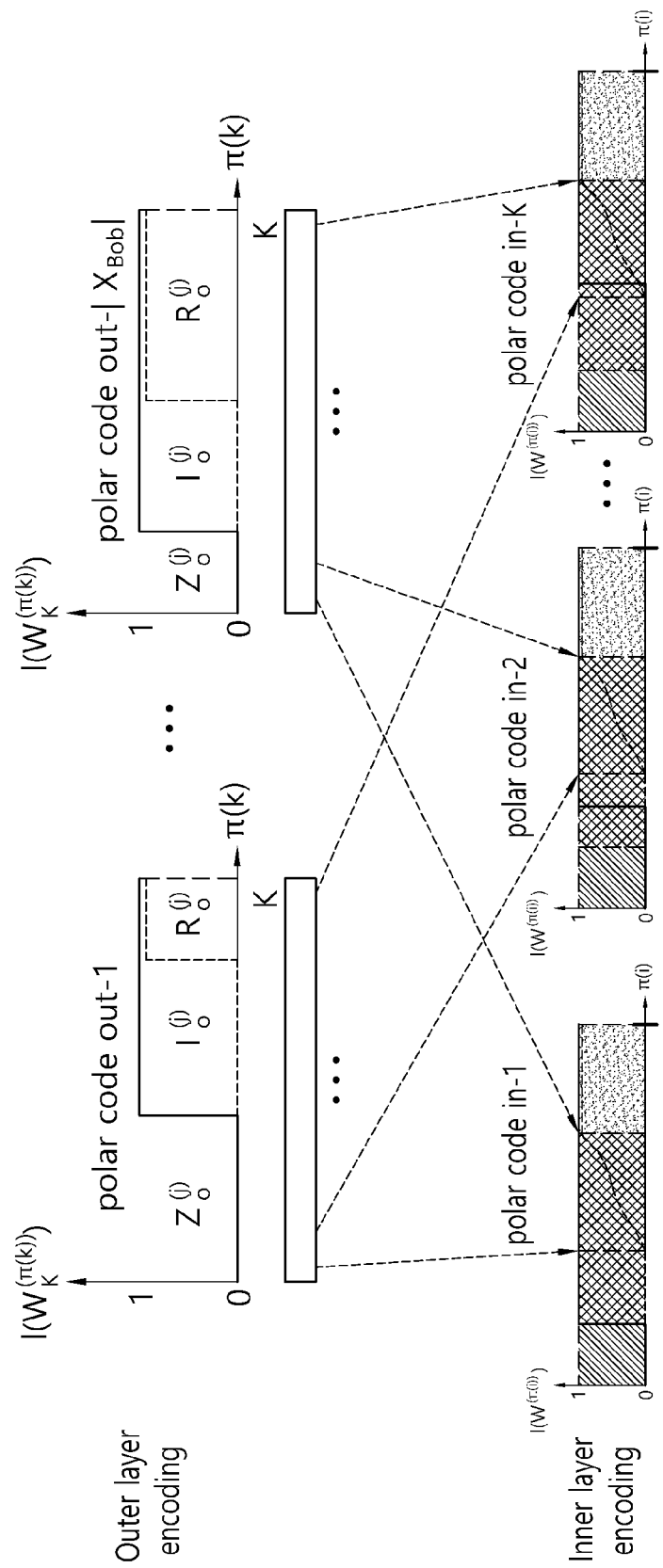

The double layer secure polar coding scheme will be descriebd below in detail wherein the double layer polar coding scheme is divided into outer and inner layer encoding schemes. FIG. 8 and FIG. 9 illustrate a concept of the double layer secure polar coding scheme when the instantaneous channel information for Bob is not known to Alice:

Outer layer encoding scheme: a j-th secure polar code in an outer layer is constructed as follows:

$$\tilde{\pi}(v^{(j)}) = [\underbrace{0,\ldots,0}_{|Z_o^{(j)}|}, \underbrace{v_1^{(j)}, \ldots, v_{|I_o^{(j)}|}^{(j)}}_{|I_o^{(j)}|}, \underbrace{*,\ldots,*}_{|R_o^{(j)}|}], j \in \ddot{I} \cup \mathcal{X}$$

$$\tilde{u}^{(j)} = v^{(j)} G_K, j \in \ddot{I} \cup \mathcal{X}$$

$$=: [\tilde{u}_1^{(j)}, \ldots, \tilde{u}_K^{(j)}]$$

In the above, a size of each bits group $|Z_o^{(j)}|$, $|I_o^{(j)}|$, $|R_o^{(j)}|$ is defined as follows:

$$|Z_c^{(j)}| = K(1 - I(W_b^{(j)})) = K\left(1 - \tilde{F}_C^b\left(\frac{j}{N}\right)\right), j \in \ddot{I} \cup \mathcal{X}$$

$$|I_c^{(j)}| = \begin{cases} KI(W_b^{(j)}) = K\tilde{F}_C^b\left(\frac{j}{N}\right), & \text{for } j \in \ddot{I} \\ K(I(W_b^{(j)}) - I(W_c^{(j)})) = K\left(\tilde{F}_C^b\left(\frac{j}{N}\right) - \tilde{F}_C^c\left(\frac{j}{N}\right)\right), & \text{for } j \in \mathcal{X} \end{cases}$$

$$|R_c^{(j)}| = \begin{cases} 0, & \text{for } j \in \ddot{I} \\ KI(W_c^{(j)}) = K\tilde{F}_C^{(j)}\left(\frac{j}{N}\right), & \text{for } j \in \mathcal{X} \end{cases}$$

where j=1, ..., |x|, and $|Z_0^{(j)}|+|I_0^{(j)}|+|R_0^{(j)}|=K$

Mapping between inner and outer layer encoding schemes:

K coded bits $\tilde{u}^{(j)}=[\tilde{u}_1^{(j)}, \ldots, \tilde{u}_K^{(j)}]$ using the j-th polar code in the outer layer are mapped with a j-th bit in the IUX bits group corresponding to all of K codewords in the inner layer.

Inner layer encoding scheme: a k-th secure polar code in an inner layer is constructed as follows:

$$\pi(u^{(k)}) = [\underbrace{0,\ldots,0}_{|\ddot{Z}|}, \underbrace{\tilde{u}_k^{(j_1)}, \ldots, \tilde{u}_k^{(j_{|\ddot{I}|})}}_{|\ddot{I}| \text{ for } j_i \in \ddot{I}}, \underbrace{\tilde{u}_k^{(j_1)}, \ldots, \tilde{u}_k^{(j_{|\mathcal{X}|})}}_{|\mathcal{X}| \text{ for } j_i \in \mathcal{X}}, \underbrace{*,\ldots,*}_{|\mathcal{R}|}],$$

for $k = 1, \ldots, K$ $$x^{(k)} = u^{(k)} G_N$$

3.3.2 Double Layer Decoding Scheme

The double layer secure polar decoding scheme avaliable when the instantaneous channel information for Bob is not known to Alice is substantially the same as the double layer secure polar decoding scheme avaliable when the instantaneous channel information for Bob is known to Alice. Thus, details about the former decoding scheme are omitted.

3.4 Secure Data Transmission Rate

For both cases where the instantaneous channel information for Bob is known or not known to Alice, an average data transmission rate $R_{dou}$ using the present double-layer secure polar coding scheme is given as follows:

$$R_{don} = A_{\ddot{I}} + A_{\mathcal{X}}$$

where $$A_{\ddot{I}} = \frac{1}{N} \sum_{\pi(i) \in \ddot{I}} \tilde{F}_C^b\left(\frac{\pi(i)}{N}\right) \geq 0$$

$$A_{\mathcal{X}} = \frac{1}{N} \sum_{\pi(i) \in \mathcal{X}} \left(\tilde{F}_C^b\left(\frac{\pi(i)}{N}\right) - \tilde{F}_C^c\left(\frac{\pi(i)}{N}\right)\right) \geq 0$$

4. Interleaved Single-Layer Secure Polar Coding Scheme

As a different approach from the double-layer secure polar coding scheme, an interleaved single layer secure polar coding scheme is set forth. In this method, K fading blocks are subjected to an interleaving operation. All of K polar codewords transmitted via the K fading blocks are the same as each other and are given as follows:

$$\pi(u_{int}) = \left[\underbrace{0,\ldots,0}_{|Z_{int}|}, \underbrace{u_1, \ldots, u_{|I_{int}|}}_{|I_{int}|}, \underbrace{*,\ldots,*}_{|R_{int}|}\right], \text{ for all } j = 1, \ldots, K$$

$$x_{int} = u_{int} G_N, \text{ for all } j = 1, \ldots, K$$

$$=: [x_1, \ldots, x_N]$$

In the above, a size of each bits group or set is defined as follows:

$$|Z_{int}| = N\left(1 - \dddot{I}_N^b\right)$$

$$|I_{int}| = N\left(\dddot{I}_N^b - \dddot{I}_N^c\right)$$

$$|R_{int}| = N\left(\dddot{I}_N^c\right)$$

where $$\dddot{I}_N^b = \frac{1}{N} \sum_{\pi(i)=1}^{N} \tilde{F}_C^b\left(\frac{\pi(i)}{N}\right)$$

$$\dddot{I}_N^c = \frac{1}{N} \sum_{\pi(i)=1}^{N} \tilde{F}_C^c\left(\frac{\pi(i)}{N}\right)$$

Using a mathematical analysis, it is shown that the average transmission rate $R_{init}$ of the interleaved single-layer secure polar coding scheme is the same as the average transmission rate $R_{dou}$ of the double-layer secure polar coding scheme.

5. Transmission Power Optimization when Instantaneous Channel Information for Bob is Known When the instantaneous channel information for Bob is known, an average transmission rate R of both the double layer secure polar coding scheme and the interleaved single layer secure polar coding scheme is given as follows:

$$R = A_I + A_X$$

$$= \frac{1}{N} \sum_{\pi(i) \in \tilde{I}} \tilde{F}_\mathbb{C}^b\left(\frac{\pi(i)}{N}\right) + \frac{1}{N} \sum_{\pi(i) \in X} \left(\tilde{F}_\mathbb{C}^b\left(\frac{\pi(i)}{N}\right) - \tilde{F}_\mathbb{C}^e\left(\frac{\pi(i)}{N}\right)\right)$$

Using the above eqaution, the transmission power optimization to maximize the transmission rate may be carried out as follows:

$$R^{opt} = \max_{P_T(h_b)} \left( \frac{1}{N} \sum_{\pi(i) \in \tilde{I}} \tilde{F}_\mathbb{C}^b\left(\frac{\pi(i)}{N}\right) + \frac{1}{N} \sum_{\pi(i) \in X} \left(\tilde{F}_\mathbb{C}^b\left(\frac{\pi(i)}{N}\right) - \tilde{F}_\mathbb{C}^e\left(\frac{\pi(i)}{N}\right)\right)\right)$$

$$\text{subject to } \mathbb{E}[P_T(h_b)] \leq \overline{P}_T$$

where $\overline{P}_T$ refers to a limit value of an average transmission power.

Especially, when using the double layer secure polar coding scheme, the average transmission rate $R_{dou}$ thereof may be expressed as follows:

$$R_{dou}^{opt} = \max_{P_T(h_b)} R_{dou} \text{ subject to } \mathbb{E}[P_T(h_b)] \leq \overline{P}_T$$

where $$R_{dou} = \frac{1}{NK} \sum_{k=1}^{K} \sum_{\pi(i) \in \tilde{I}(k)} I(W_b^{(\pi(i))} \mid \mathbb{C}_b(k)) + \frac{1}{N} \sum_{\pi(i) \in X} \left(\tilde{F}_\mathbb{C}^b\left(\frac{\pi(i)}{N}\right) - \tilde{F}_\mathbb{C}^e\left(\frac{\pi(i)}{N}\right)\right)$$

In the above formula, $I(W_b^{(\pi(i))} \mid \mathbb{C}_b(k))$ refers to the instantaneous mutual information for each fading block. Therefore, when using the double layer secure polar coding scheme, the transmission rate thereof may be optimized by optimization of the instantaneous mutual information for each fading block.

6. Comparison between Interleaved Single-Layer Secure Polar Coding scheme and Double-Layer Secure Polar Coding Scheme In terms of an implementation complexity, the interleaved single layer secure polar coding scheme has a lower complexity than the double-layer secure polar coding scheme. This is because for the interleaved single layer secure polar coding scheme, the K polar codewords with the single or same transmission rate exist in the single layer, while for the double-layer secure polar coding scheme, the polar codewords with the different transmission rates exist in the two layers. However, in terms of a transmission delay, when the instantaneous channel information for Bob is known to Alice, the double-layer secure polar coding scheme has a lower transmission delay than the interleaved single layer secure polar coding scheme. For the double-layer secure polar coding scheme, the bits belonging to the bits set I (k) do not suffer from the transmission delay, but only the bits belonging to the bits set X suffer from the transmission delay. To the contrary, for the interleaved single-layer secure polar coding scheme, all transmitted bits undergo the transmission delay. When the instantaneous channel information for Bob is known to Alice, theoretically, the transmission power optimization may be performed for both the double-layer secure polar coding scheme and the interleaved single-layer secure polar coding scheme. However, for the double layer secure polar coding scheme, the transmission power optimization may be performed so as to maximize the mutual information between the information bits and received signal.

In conclusion, when the instantaneous channel information for Bob is known to Alice, the double-layer secure polar coding scheme may be more preferable than the interleaved single-layer secure polar coding scheme. When the instantaneous channel information for Bob is not known to Alice, the interleaved single-layer secure polar coding scheme may be more preferable than the double-layer secure polar coding scheme.

7. Interleaved Double-Layer Secure Polar Coding Scheme

In this section, an interleaved double-layer secure polar coding scheme having a combination of the advantages of the double-layer secure polar coding scheme and the interleaved single-layer secure polar coding scheme. This new interleaved double-layer secure polar coding scheme has the lower transmission delay and esay transmission power optimization as the advantages of the double-layer secure polar coding scheme, and has the lower implementation complexity as the advantage of the interleaved single-layer secure polar coding scheme.

When using the interleaved double-layer secure polar coding scheme, for the k-th fading block, following for bits groups or sets may be considered:

$$\mathcal{Z}(k) = \{\pi(i) \in [1,N] : I(W_b^{(\pi(i))} \mid \mathbb{C}_b(k)) < \delta_b\}$$

$$\mathcal{I}(k) = \{\pi(i) \in [1,N] : \delta_b \leq I(W_b^{(\pi(i))} \mid \mathbb{C}_b(k)) \leq 1-\delta_b, \text{ and } I(W_e^{(\pi(i))}) < \delta_e\}$$

$$\tilde{X} = \text{Interleave}\{X : k=1, \ldots, K\} = \{\pi(i) \in [1,N] : \delta_e \leq I(W_e^{(\pi(i))}) \leq 1-\delta_e\}, \text{ for all } k$$

$$\mathcal{R} = \{\pi(i) \in [1,N] : I(W_e^{(\pi(i))}) > 1-\delta_e\}, \text{ for all } k$$

Among the above bits sets, three bits sets (Z(k), I (k), R) are the same as those in the above-described double-layer secure polar coding scheme. However, the bits set $\tilde{X}$ is different from the above-described bits set X. The bits set $\tilde{X}$ is obtained by interleaving K bits sets X of K outer polar codewords:

Outer layer encoding scheme: a j-th secure polar code in an outer layer is constructed as follows:

$$\tilde{\pi}(v^{(j)}) = [\underbrace{0, \ldots, 0}_{|\mathcal{Z}_o|}, \underbrace{v_1^{(j)}, \ldots, v_{|\mathcal{I}_o|}^{(j)}}_{|\mathcal{I}_o|}, \underbrace{*, \ldots, *}_{|\mathcal{R}_o|}], j \in \tilde{X}$$

$$\tilde{u}^{(j)} = v^{(j)} G_K, j \in \tilde{X}$$
$$=: [\tilde{u}_1^{(j)}, \ldots, \tilde{u}_K^{(j)}]$$

In the above, $|\mathcal{Z}_o|, |\mathcal{I}_o|, |\mathcal{R}_o|$ are defined as follows:

$$|\mathcal{Z}_o| = K\left(1 - \frac{1}{|\tilde{X}|} \sum_{j \in \tilde{X}} I(W_b^{(j)})\right) = K\left(1 - \frac{1}{|\tilde{X}|} \sum_{j \in \tilde{X}} \tilde{F}_\mathbb{C}^b\left(\frac{j}{N}\right)\right)$$

$$|\mathcal{I}_o| = \frac{K}{|\tilde{X}|} \sum_{j \in \tilde{X}} \left(I(W_b^{(j)}) - I(W_e^{(j)})\right) = \frac{K}{|\tilde{X}|} \sum_{j \in \tilde{X}} \left(\tilde{F}_\mathbb{C}^b\left(\frac{j}{N}\right) - \tilde{F}_\mathbb{C}^e\left(\frac{j}{N}\right)\right)$$

$$|\mathcal{R}_o| = \frac{K}{|\tilde{X}|} \sum_{j \in \tilde{X}} I(W_e^{(j)}) = \frac{K}{|\tilde{X}|} \sum_{j \in \tilde{X}} \tilde{F}_\mathbb{C}^e\left(\frac{j}{N}\right)$$

where j=1, . . . , $|\tilde{X}|$, and $|\mathcal{Z}_o|+|\mathcal{I}_o|+|\mathcal{R}_o|=K$ Mappings between the inner and outer layer encoding schemes and the double layer decoding scheme in this interleaved double layer secure polar coding scheme are conceptionally the same as those in the above-described double layer secure polar coding scheme.

Figure 10:
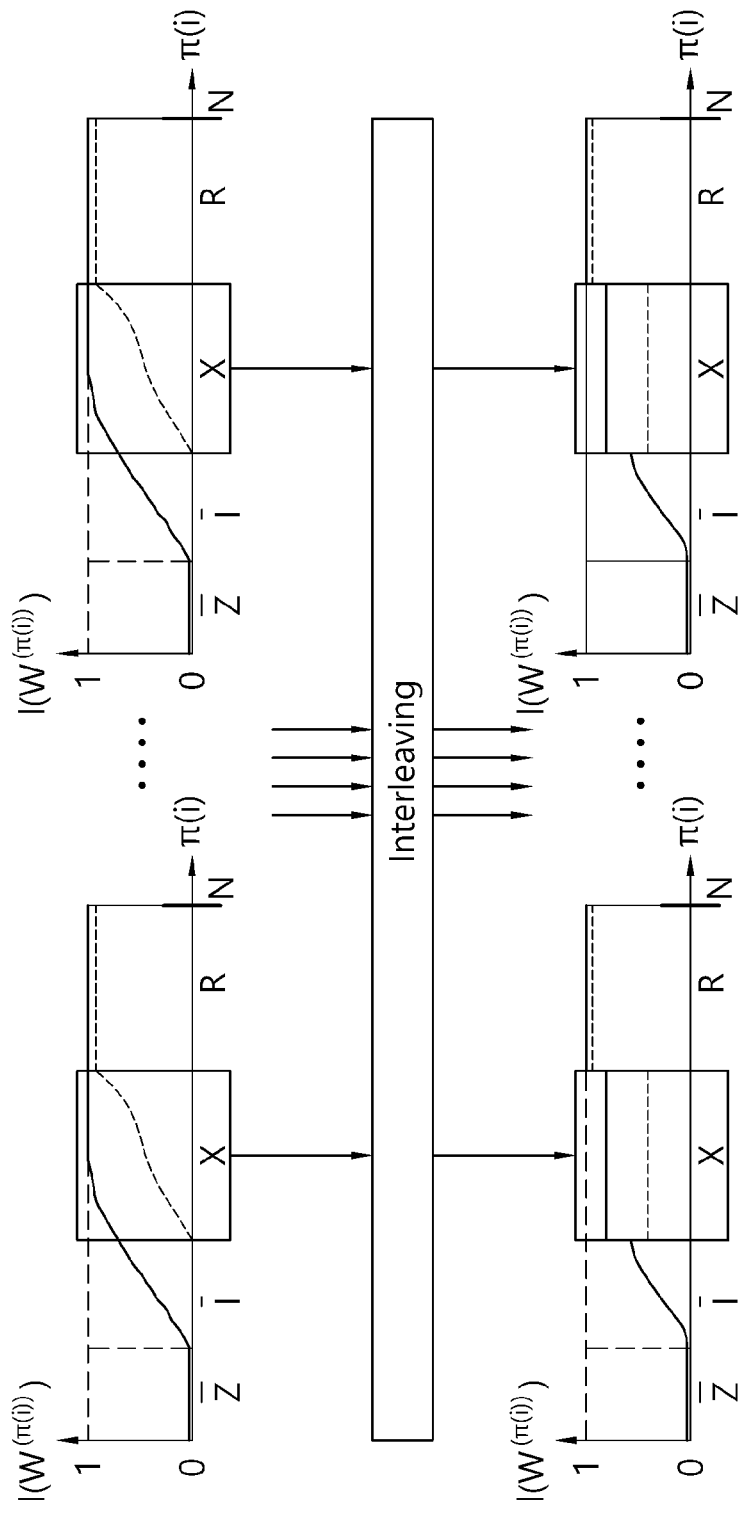
FIGS. 10, 11 and 12 illustrate a concept of the interleaved double layer secure polar encoding scheme.
Figure 11:
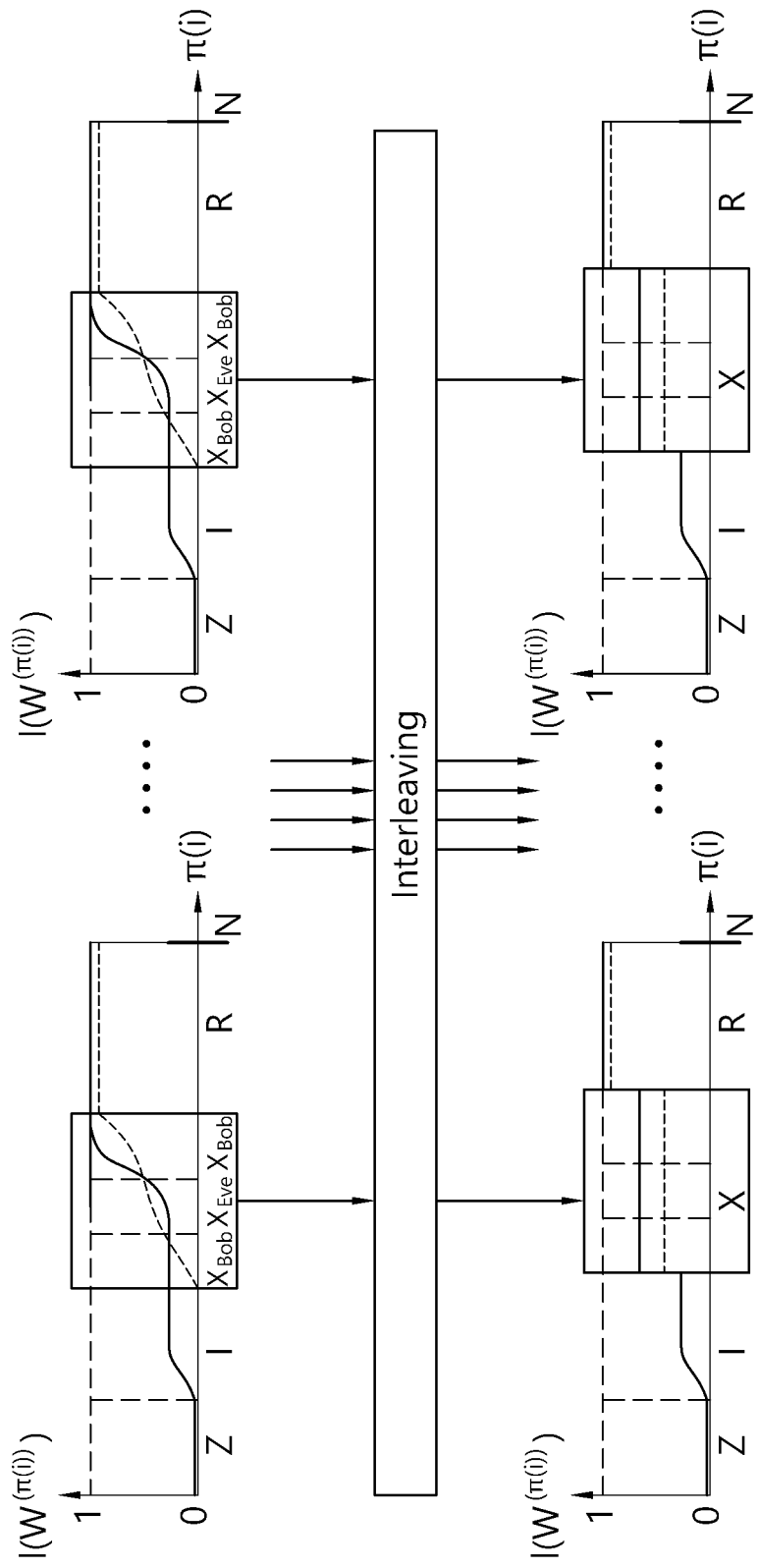
Figure 12:
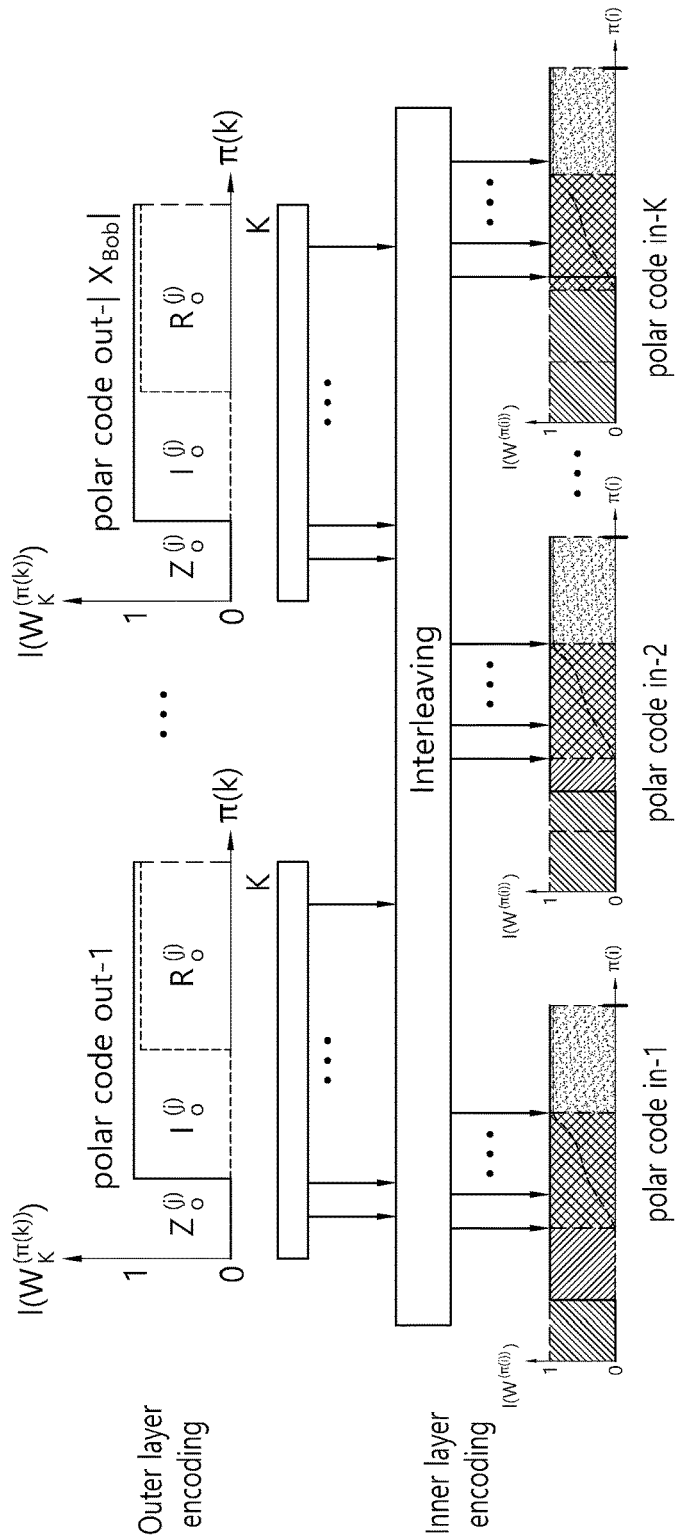

In this connection, FIGS. 10, 11 and 12 illustrate a concept of the interleaved double layer secure polar encoding scheme.

8. HARQ Based on Secure Polar Coding Scheme

The above set-forth double-layer secure polar coding scheme, interleaved single-layer secure polar coding scheme, and interleaved double-layer secure polar coding schemes exhibit very good performance in terms of the transmission rate. However, the above three secure polar coding schemes all have the disadvantage that they may cause considerable transmission delays. In order to solve this problem, a secure HARQ scheme based on the polar coding scheme is suggested as a novel approach by which the transmission delay may be reduced though the transmission rate may be sacrificed.

8.1 When Instantaneous Channel Information for Bob is Known to Alice

First, it is assumed that a bits set $X_e$ is defined as follows:

$$X_e = \{\pi(i) \in [1,N] : \delta_e \le I(W_e^{(\pi(i))}) \le 1 - \delta_e\}$$

In this section, the bits belonging to the bits set $X_e$ are subjected to a SPC (single parity check) coding operation. Since any feedback signals such as ACKnowledge (hereinafter, ACK) or Nagative-ACK (hereinafter, NACK) are not sent from Eve to Alice, such feedback signals are not considered. Detailed descriptions about the SPC coding are described in a following [Ref 3]:

[Ref 3] I Land and J. Huber, *Information Combining, Foundations and Trends in Corn-munications and Information Theory*, 2006.

It is assumed that bits $\{b_1, b_2, \ldots, b_{|X_e|}\}$ refer to information bits to be transmitted via the bits set $X_e$ of the polar code. An information bit $b_m$ is coded using the SPC code with a length $S_m$:

$$b_1 = B_{1,1} \oplus B_{1,2} \oplus \ldots \oplus B_{1,S_1}$$
$$b_2 = B_{2,1} \oplus B_{2,2} \oplus \ldots \oplus B_{2,S_2}$$
$$\vdots$$
$$b_{|X_e|} = B_{|X_e|,1} \oplus B_{|X_e|,2} \oplus \ldots \oplus B_{1,S_{|X_e|}}$$

For the actual data transmission, instead of transmitting the bit $b_m$, the bits $\{B_{m,1}, B_{m,2}, \ldots, B_{m,S_m}\}$ are sent as follows:

In order to transmit the information bits $b_1$, each of bits $\{B_{1,1}, B_{1,2}, \ldots, B_{1,S_1}\}$ is employed as a $\pi(i) = \alpha_1$-th input bit for the polar coding scheme. Thus, the polar coding scheme is carried out. After all, the information bits $b_1$ are transmitted via $S_1$ polar codewords corresponding to $S_1$ fading blocks respectively.

In order to transmit the information bits $b_2$, each of bits $\{B_{2,1}, B_{2,2}, \ldots, B_{2,S_2}\}$ is employed as a $\pi(i) = \alpha_2$-th input bit for the polar coding scheme. Thus, the polar coding scheme is carried out. After all, the information bits $b_2$ are transmitted via $S_2$ polar codewords corresponding to $S_2$ fading blocks respectively.

In order to transmit the information bits $b_{|X_e|}$, each of bits $\{B_{|X_e|,1}, B_{|X_e|,2}, \ldots, B_{|X_e|,S_{|X_e|}}\}$ is employed as a $\pi(i) = \alpha_{|X_e|}$-th input bit for the polar coding scheme. Thus, the polar coding scheme is carried out. After all, the information bits $b_{|X_e|}$ are transmitted via $S_{|X_e|}$ polar codewords corresponding to $S_{|X_e|}$ fading blocks respectively.

Eventually, a code rate at the time of the SPC coding of the information bit $b_m$ is given as follows:

$$R_m = \frac{1}{S_m}$$

In order to maximize the code rate for each bit, $S_m$ may be optimized as follows:

$$S_m^{opt} = \min_S \text{ subject to } \underbrace{SPC(I(W^{(\alpha_m)}), I(W^{(\alpha_m)}), \ldots, I(W^{(\alpha_m)}))}_{S \text{ transmissions}} \le I_e^{Th}$$

where $m = 1, \ldots, |X_e|$. The mutual information $SPC(I(\cdot), I(\cdot), \ldots, I(\cdot))$ obtained by the SPC coding scheme may be found out using a method disclosed in the above [Ref 3].

The mutual information is smaller than a mutual information of origianl bit channel when the SPC coding scheme is applied in the bit channel. The more the SPC code length become longer (that is, SPC coding scheme using more bit channels over more frames), the more an actual mutual information become smaller. In this case, becasue only one information bit is transmitted via all bit channels encoded with SPC coding scheme, information transmission rate become lower. On the other hand, The more the SPC code length is short (that is, SPC coding scheme using a few bit channels over a few frames), the more actual mutual information is less small. In this case, becasue only one information bit is transmitted via all bit channels encoded with SPC coding scheme, information transmission rate become higher.

Figure 13:
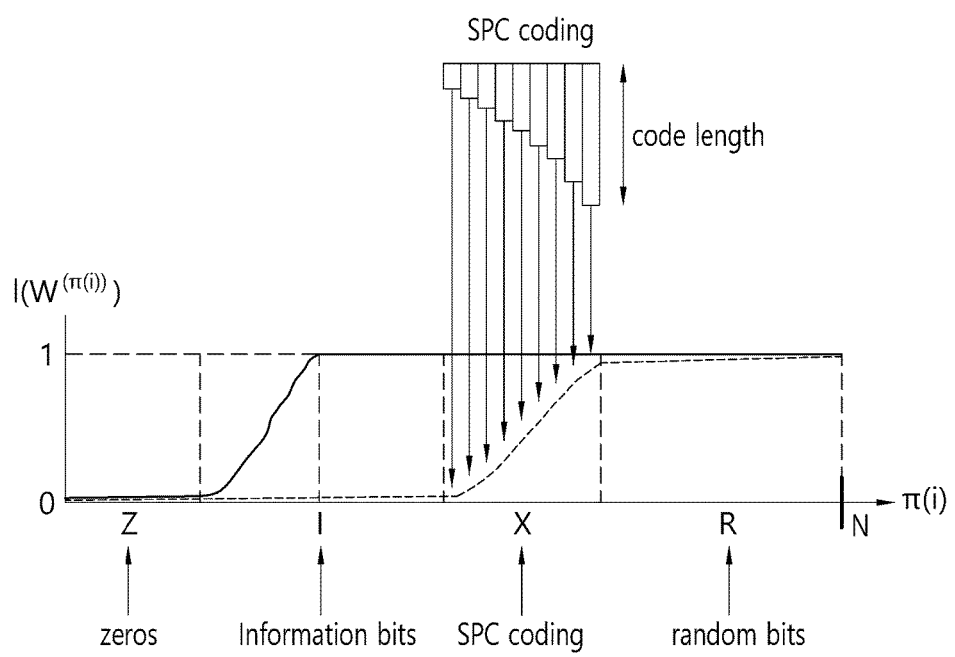
FIG. 13 illustrates a concept of the HARQ scheme when the instantaneous channel information for Bob is known to Alice.

FIG. 13 illustrates a concept of the HARQ scheme when the instantaneous channel information for Bob is known to Alice. And, FIG. 14 illustrates a concept of the SPC coding scheme for the HARQ scheme when the instantaneous channel information for Bob is known to Alice.

Reffering to FIG. 13, the SPC coding schemes will have different lengths based on a position of bit channel in the X bits group. It is assumed that the number of the bit channels in the X bits group is 9. The mutual information associated with Eve is relatively small at a leftest bit channel of the bit channels in the X bits group (however, because it is not small enough, the information bits without SPC coding scheme can not transmitted). On the other hand, The mutual information associated with Eve is relatively bigger at a rightest bit channel of the bit channels in the X bits group (naturally, the information bits can not transmitted).

Reffering to FIG. 13, the information bits will be transmitted by reducing the mutual information enough, via the bit channels in the X bits group. In the case of the leftest bit channel, because it is secure bit channel from Eve by a little reduction of the mutual informatioan, a length of a code for SPC coding scheme is shortest. However, in the case of the rightest bit channel, because it is secure bit channel from Eve by a lot of reduction of the mutual informatioan, a length of a code for SPC coding scheme is longest.

Figure 14:
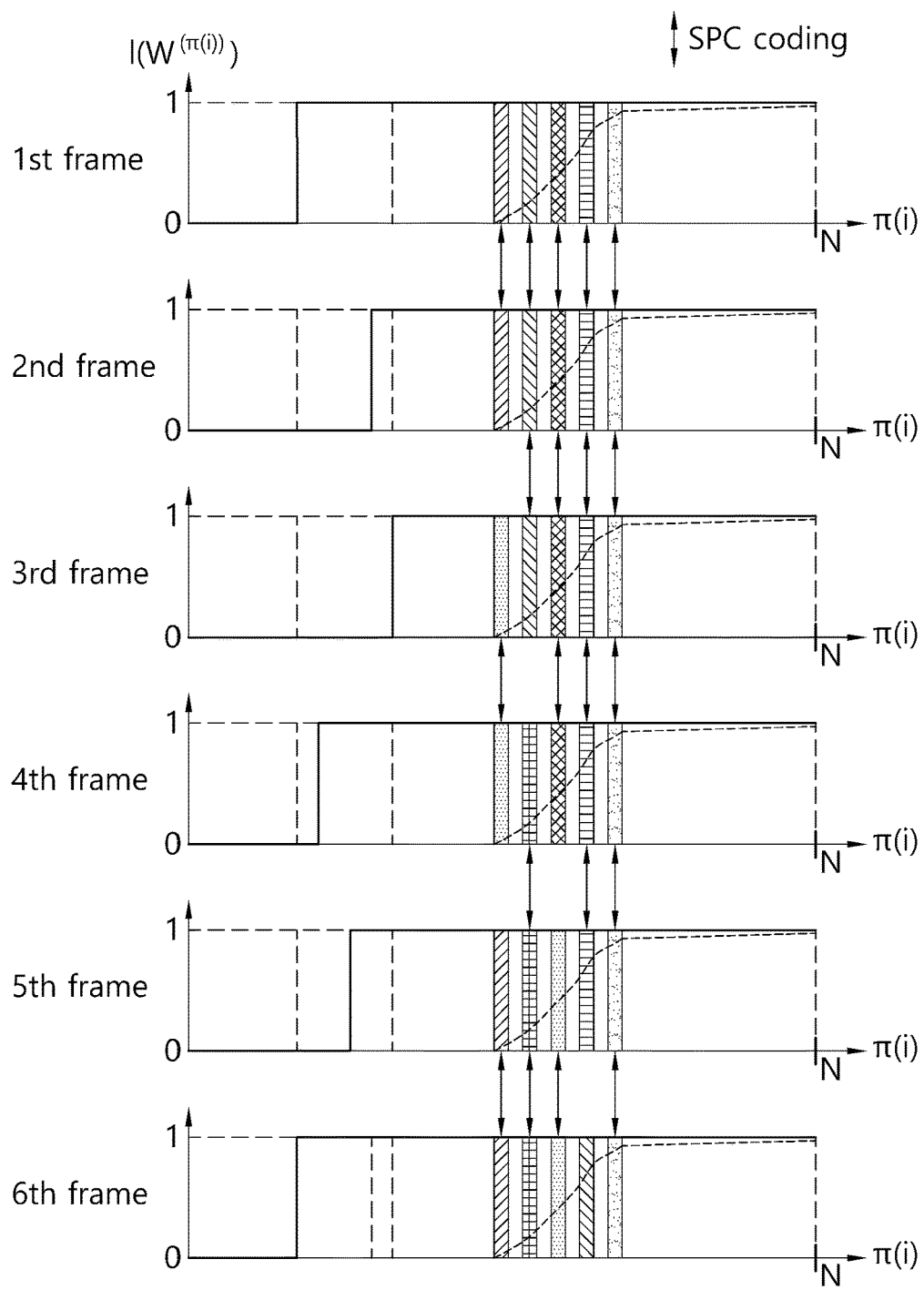
FIG. 14 illustrates a concept of the SPC coding scheme for the HARQ scheme when the instantaneous channel information for Bob is known to Alice.

Reffering to FIG. 14, the bit channels encoded by the same SPC coding scheme are presented with the same color block. The bit channels encoded by the same SPC coding scheme are connected to each other with a arrow. the one information bit is transmitted via the bit channels presented with the same color block (that is, the bit channels connected to each other with a arrow). It is assumed that the number of the bit channels in the X bits group is 5. The leftest bit channel of the bit channels in the X bits group will be secure bit channel by a little reduction of the mutual information. Therefore, the leftest bit channel of a first frame and the leftest bit channel of a second frame are encoded by the same SPC coding scheme. In this case, one information bit is transmitted via the leftest bit channels of the first frame and the second frame. A length of code for the same SPC coding scheme is 2. The leftest bit channel of a third frame and the leftest bit channel of a fourth frame are encoded by the same SPC coding scheme. Also, the leftest bit channel of a fifth frame and the leftest bit channels of a sixth frame are encoded by the same SPC coding scheme. Finally, three information bits are treansmitted via the leftest bit channels of each 6 frames.

The second leftest bit channel of the first frame, the second leftest bit channel of the second frame, and the second leftest bit channel of the third frame are encoded by the same SPC coding scheme. In this case, one information bit is transmitted via the second leftest bit channels of the first frame, the second frame and the third frame. A lengoth of code for the same SPC coding scheme is 3. The second leftest bit channel of the fourth frame, the second leftest bit channel of the fifth frame, and the second leftest bit channel of the sixth frame are encoded by the same SPC coding scheme. Finally, two information bits are transmitted via the second leftest bit channels of each 6 frames.

The third leftest bit channel of the first frame, the third leftest bit channel of the second frame, the third leftest bit channel of the third frame, and the third leftest bit channel of the fourth frame are encoded by the same SPC coding scheme. In this case, a length of code for the same SPC coding scheme is 4.

The fourth leftest bit channel of the first frame, the fourth leftest bit channel of the second frame, the fourth leftest bit channel of the third frame, the fourth leftest bit channel of the fourth frame, and fourth leftest bit channel of the fifth frame are encoded by the same SPC coding scheme. In this case, a length of code for the same SPC coding scheme is 5.

Lastly, the fifth leftest bit channel of the first frame, the fifth leftest bit channel of the second frame, the fifth leftest bit channel of the third frame, the fifth leftest bit channel of the fourth frame, the fifth leftest bit channel of the fifth frame, and fifth leftest bit channel of the sixth frame are encoded by the same SPC coding scheme. In this case, a length of code for the same SPC coding scheme is 6. Finally, only one information bit is transmitted via the rightest bit channels of each 6 frames.

In conclusion, the more the mutual information become smaller, the more the number of the bit channels encoded by the same SPC coding scheme become bigger. Contrariwise, the more the mutual information become bigger, the more the number of the bit channels encoded by the same SPC coding scheme become smaller. By the same token, an additional information bits can be transmitted by reducing the mutual information of bit channels in the X bits group with a minimized loss of the transmission rate.

8.2 When Instantaneous Channel Information for Bob is Unknown 8.2.1 Coding Scheme for Bits Set $X_b$ First, it is assumed that the bits set $X_b$ is defined as follows:

$$X_b = \{\pi(i) \in [1,N] : \delta_b \leq I(W_b^{(\pi(i))}) \leq 1-\delta_b\}$$

In this section, the bits belonging to the bits set $X_b$ are subjected to a REP (repetition) coding scheme. The REP coding scheme is different from the above-described SPC coding scheme in that the REP coding scheme employs a feedback signal, such as ACK or NACK from Bob to Alice.

It is assumed that bits $\{b_1, b_2, \ldots, b_{|X_b|}\}$ refer to information bits to be transmitted via the bits set $X_b$ to be subejcted to the polar coding scheme. First, the information bits $b_m$ are coded using the REP code having a length S. That is, the same information bits $b_m$ are transmitted via repetition of S secure polar coding schemes corresponding to S fading blocks respectively:

- An information bit $b_1$ is transmitted via repetition of the S secure polar coding schemes. In this connection, it is assumed that, when the information bit $b_1$ is subjected to a m-th secure polar coding scheme among the S secure polar coding schemes, the information bit $b_1$ is used as a $\pi(i)=\alpha_{1,m}$-th input bit for the polar coding scheme, whereinm=1, . . . , S.
- An information bit $b_2$ is transmitted via repetition of the S secure polar coding schemes. In this connection, it is assumed that, when the information bit $b_2$ is subjected to a m-th secure polar coding scheme among the S secure polar coding schemes, the information bit $b_1$ is used as a $\pi(i)=\alpha_{2,m}$-th input bit for the polar coding scheme, whereinm=1, . . . , S.
- An information bit $b_{|X_b|}$ is transmitted via repetition of the S secure polar coding schemes. In this connection, it is assumed that, when the information bit $b_{|X_b|}$ is subjected to a m-th secure polar coding scheme among the S secure polar coding schemes, the information bit $b_1$ is used as a $\pi(i)=\alpha_{|X_b|,m}$-th input bit for the polar coding scheme, whereinm=1, . . . , S.

When the information bits are transmitted in the above manner, an entire transmission schedule may be represented as a following matrix A with column vectors thereof $\alpha_s$, s={1, 2, . . . , S}:

$$\mathcal{A} = [\alpha_1, \alpha_2, \ldots, \alpha_S] = \begin{bmatrix} \alpha_{1,1} & \alpha_{1,2} & \cdots & \alpha_{1,S} \\ \alpha_{2,1} & \alpha_{2,2} & \cdots & \alpha_{2,S} \\ \vdots & \vdots & \ddots & \vdots \\ \alpha_{|X_b|,1} & \alpha_{|X_b|,2} & \cdots & \alpha_{|X_b|,S} \end{bmatrix}$$

In this case, because the S iterations are required to transmit the $|X_b|$ information bits, the transmission rate of the REP coding scheme is 1/S. In order to maximize the transmission rate, a following optimization may be considered:

$$\mathcal{A}^{opt} = \underset{\mathcal{A}}{\arg\min}\, S \text{ subject to } \min_{m=1,2,\ldots,|X_b|} I_m^{min}(S) \geq I_b^{Th}$$

where $$I_m^{min}(S) = REP(I(W^{(\alpha_m,1)}), I(W^{(\alpha_m,2)}), \ldots, I(W^{(\alpha_m,S)}))$$

represnets mutual information obtained by the REP coding scheme.

When performing the REP coding scheduling in this manner, it is possible to maximize the transmission rate. However, the complexity of determining the optimum matrix A may be very high. Thus, multiple suboptimal methods may be considered. One example thereof is as follows:

- $\alpha_1$ is selected randomly.
- It is assumed that $\psi_1(\alpha_1)$ refers to a vector obtained via an arrangement of $\alpha_1$ in a decreasing direction of $I(W^{(\alpha_m,1)})$ value.
- $\alpha_2 = \psi_1(\alpha_1)$.
- It is assumed that $\psi_2(\alpha_1, \alpha_2)$ refers to a vector obtained via an arrangement of $\alpha_1$ in a decreasing direction of REP $(I(W^{(\alpha_m,1)}), I(W^{(\alpha_m,2)}))$ value.

$\alpha_3 = \psi_2(\alpha_1, \alpha_2)$.

Generally, $\alpha_{S+1} = \psi_S(\alpha_1, \alpha_2, \ldots, \alpha_S)$.

This method requires only a very low amount of calculation, and exhibits a performance approximate to an optimum performance.

8.2.2 Coding Scheme for Bits Set $X_e$

Figure 15:
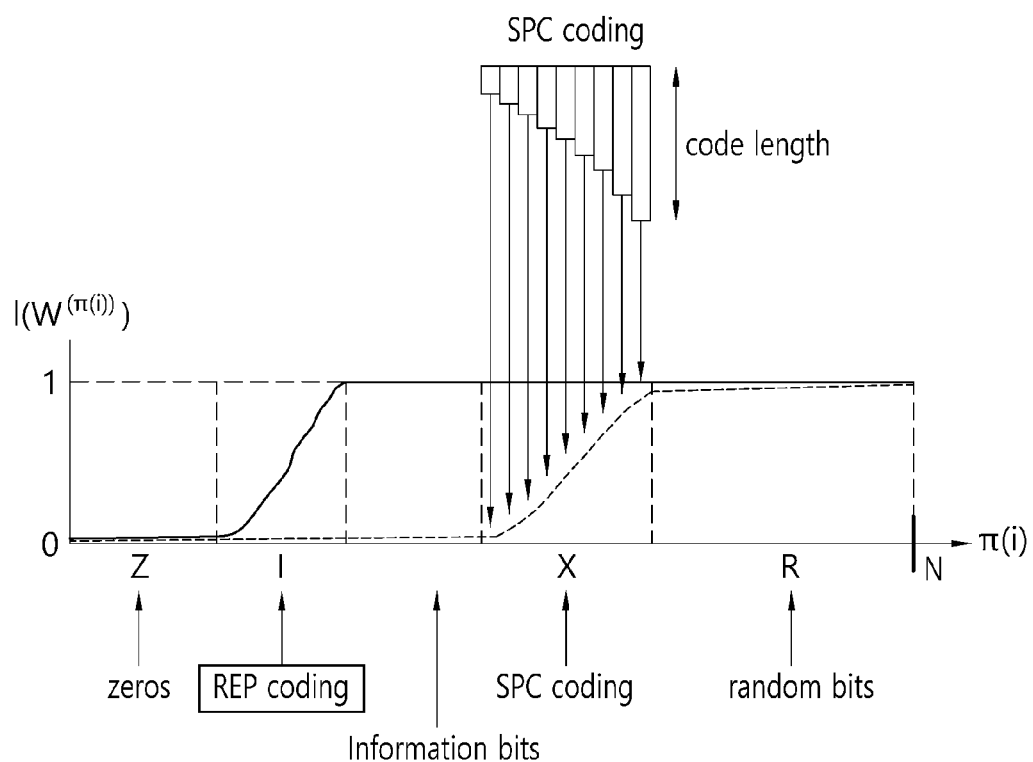
FIG. 15 illustrates a concept of the HARQ scheme when the instantaneous channel information for Bob is unknown to Alice.
Figure 16:
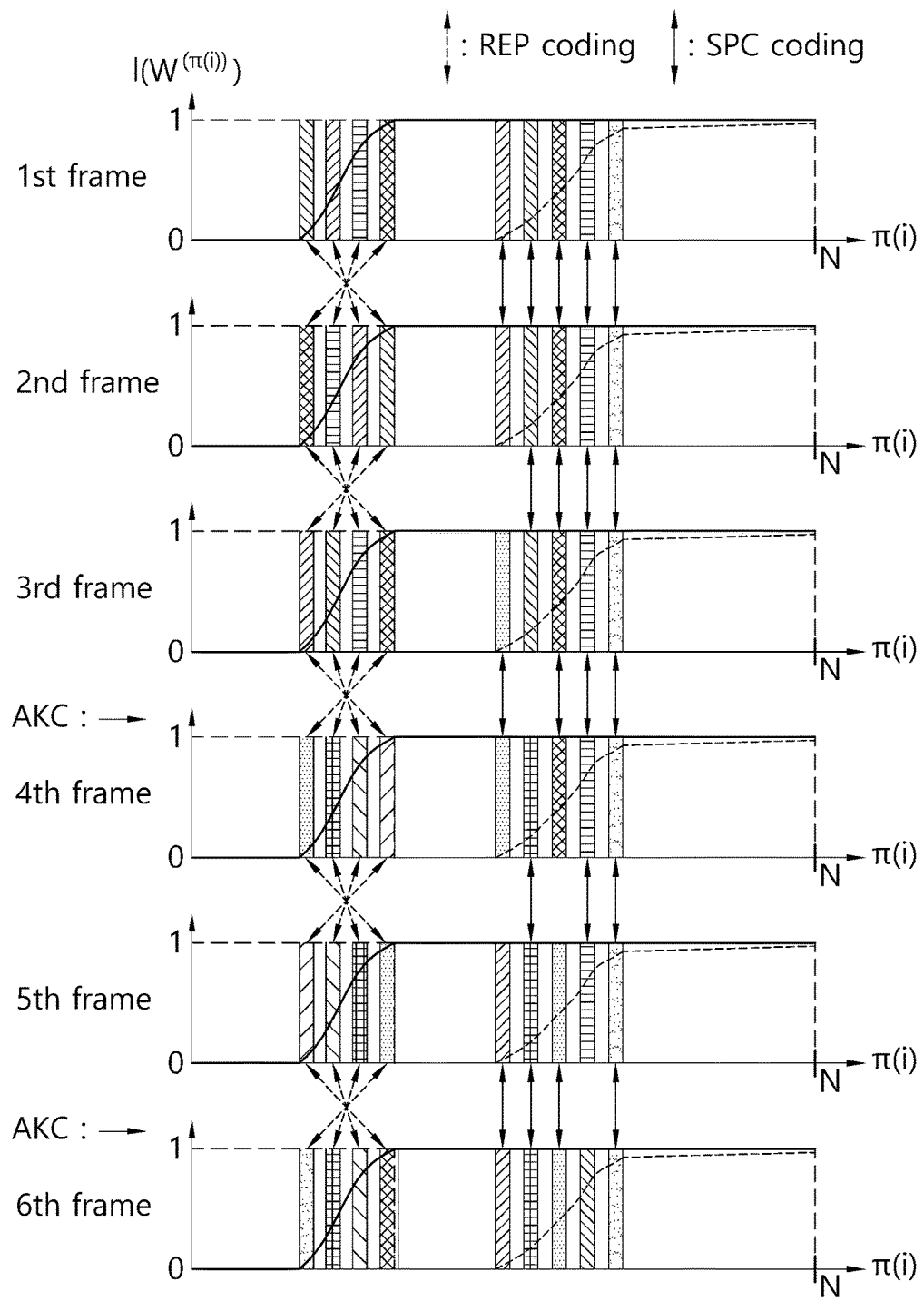
FIG. 16 illustrates a concept of the SPC coding and REP coding schemes for the HARQ scheme when the instantaneous channel information for Bob is unknown to Alice.

It is the same as the above-described SPC coding scheme available when the instantaneous channel information for Bob is known. FIG. 15 illustrates a concept of the HARQ scheme when the instantaneous channel information for Bob is unknown to Alice. And, FIG. 16 illustrates a concept of the SPC coding and REP coding schemes for the HARQ scheme when the instantaneous channel information for Bob is unknown to Alice.

Figure 17:
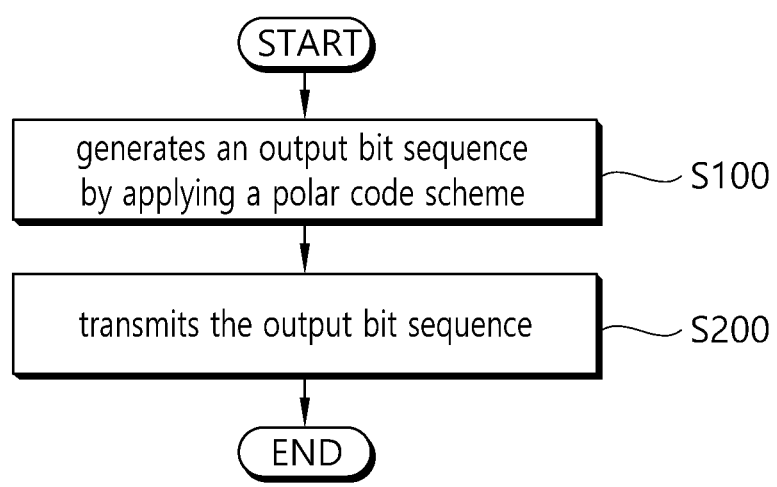
FIG. 17 is a flowchart illustrating security communication method according to an embodiment of the present invention.

FIG. 17 is a flowchart illustrating security communication method according to an embodiment of the present invention.

According to FIG. 17, a communication device generates an output bit sequence by applying a polar code scheme to an input bit sequence, as discloses in embodiments of FIG. 4 to FIG. 7 (step S100)

More specifically, the input bit sequence includes a first bits group, a second bits group, a third bits group and a fourth bits group. The first bits group includes bit channels of which mutual information for the target receiver is smaller than a first predetermined value. The second bits group includes bit channels of which the mutual information for the target receiver is greater than the first predetermined value, and the mutual information for the eavesdropper is smaller than a third predetermined value. The third bits group includes bit channels of which the mutual information for the eavesdropper is greater than the third predetermined value, but the mutual information for the eavesdropper is smaller than a fourth predetermined value. The fourth bits group includes bit channels of which the mutual information for the target receiver is greater than a second predetermined value, and the mutual information for an eavesdropper is greater than the fourth predetermined value. The second predetermined value can be set as 1-the first predetermined vale. The fourth predetermined value can be set as 1-the third predetermined vale. And, the output bit sequence is generated by applying a double layer polar coding scheme to the third bits group.

The double layer polar coding scheme may be divided into inner layer encoding scheme and outer layer encoding scheme.

An outer layer of the third bits group may be constructed by the outer layer encoding scheme as follows:

$$\tilde{\pi}(v^{(j)}) = \left[0, \ldots, 0, v_1^{(j)}, \ldots, v_{|I_0^{(j)}|}^{(j)}, *, \ldots, *\right]$$

The j is polar code in the outer layer. The * is a random bit. The v is an input bit vector. The $\tilde{\pi}(v)$ is a sequence of the input bit vectors. The $$\left\{v_1^{(j)}, \ldots, v_{|I_0^{(j)}|}^{(j)}\right\}$$

are secure bits which will be sent by the outer layer encoding scheme. And, the $|I_0^{(j)}|$ is mutual information for the j-th polar code.

A coded bit using the j-the polar code in the outer layer may be mapped with a j-th bit in the bits group corresponding to all of codewords in an inner layer.

An inner layer of the third bits group may be constructed by the inner layer encoding scheme as follows:

$$\pi(u^{(k)}) = [0, \ldots, 0, u_1^{(k)}, \ldots, u_{|I(k)|}^{(k)}, \tilde{u}_k^{(j1)}, \ldots, \tilde{u}_k^{(jX)}, *, \ldots, *]$$

The k is polar code in the inner layer. The * is a random bit. The u is an input bit vector. The $\pi(u)$ is a sequence of the input bit vectors. The $u_j^{(k)}$, j=1, ..., $|I_k|$ are secure bits which will be sent by the inner layer encoding scheme. And the $|I_k|$ is mutual information of the k-th polar code.

The output bit sequence may be generated by applying a single layer polar coding scheme to the second bits group.

The input bit sequence may be arranged by the mutual information in increasing order.

And the communication device transmits the output bit sequence to the target receiver (step S200).

Figure 18:
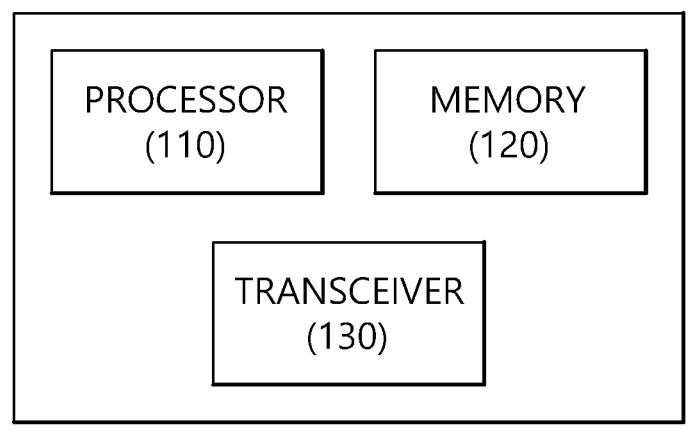
FIG. 18 is a block diagram illustrating a security communication system according to an embodiment of the present invention.

FIG. 18 is a block diagram illustrating a security communication system according to an embodiment of the present invention.

The wireless communication device 100 includes a processor 110, a memory 120 and transceiver 130. The memory 120 is connected to the processor 110, and stores various information for driving the processor 110. The transceiver 130 is connected to the processor 110, and transmits and receives signals. The processor 110 implements suggested functions, procedures, and/or methods. In the above embodiment, the operation of the wireless communication system of FIG. 18 may be implemented by the processor 110.

The processor 110 may include Application-Specific Integrated Circuits (ASICs), other chipsets, logic circuits, and/or data processors. The memory 120 may include Read-Only Memory (ROM), Random Access Memory (RAM), flash memory, memory cards, storage media and/or other storage devices. The transceiver 130 may include a baseband circuit for processing a signal. When the above-described embodiment is implemented in software, the above-described scheme may be implemented using a module (i.e., process or function, etc) which performs the above function. The module may be stored in the memory 120 and executed by the processor 110. The memory 120 may be disposed to the processor 110 internally or externally and connected to the processor 110 using a variety of well-known means.

According to the present invention, Bob can decode the data sended from Alice, but Eve can not decode the data sended from Alice. In particular, even when the instantaneous channel information for Eve is not known to Alice, the above-described schemes are available. Unlike the conventional cryptography-based secure commuication techniques, the present techniques do not require creation/management/distribution of any security key. The double layer secure polar coding scheme, interleaved single layer secure polar coding scheme, and/or interleaved double layer secure polar coding scheme may provide a high transmission rate of security data. Further, the HARQ scheme based on the secure polar coding scheme may provide a low transmission delay.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for providing a security communication, the method performed by a wireless communication device and comprising:
   segmenting, by the wireless communication device, an input bit sequence into a plurality of bits groups based on first mutual information for a target receiver, second mutual information for an eavesdropper, and a plurality of predetermined values;
   generating, by the wireless communication device, an output bit sequence by applying a polar code scheme to each of the plurality of bits groups; and
   transmitting, by the wireless communication device, the output bit sequence to the target receiver,
   wherein the plurality of bits groups includes a first bits group, a second bits group, a third bits group and a fourth bits group,
   wherein the first bits group includes bit channels of which the first mutual information is smaller than a first predetermined value,
   wherein the second bits group includes bit channels of which the first mutual information is greater than the first predetermined value, and the second mutual information is smaller than a third predetermined value,
   wherein the third bits group includes bit channels of which the second mutual information is greater than the third predetermined value, and the second mutual information is smaller than a fourth predetermined value,
   wherein the fourth bits group includes bit channels of which the first mutual information is greater than a second predetermined value, and the second mutual information is greater than the fourth predetermined value, and
   wherein the generating the output bit sequence further comprises applying a double layer polar coding scheme to the third bits group, which provides lower transmission delay and enhances transmission power optimization.

2. The method of claim 1, wherein the double layer polar coding scheme is divided into an inner layer encoding scheme and an outer layer encoding scheme.

3. The method of claim 2, wherein an output bit sequence of an outer layer of the third bits group is generated by applying the outer layer encoding scheme as follows:

$$\tilde{\pi}(v^{(j)}) = \left[0, \ldots, 0, v_1^{(j)}, \ldots, v_{|I_0^{(j)}|}^{(j)}, *, \ldots, *\right]$$

where the j is a polar code in the outer layer,
the * is a random bit,
the v is an input bit vector,
the $\tilde{\pi}(v)$ is a sequence of the input bit vectors,
the $$\left\{v_1^{(j)}, \ldots, v_{|I_0^{(j)}|}^{(j)}\right\}$$

are secure bits which will be sent by the outer layer encoding scheme, and
the $|I_0^{(j)}|$ is mutual information for the j-th polar code.

4. The method of claim 3, wherein a coded bit using the j-th polar code in the outer layer is mapped with a j-th bit in the bits group corresponding to all of codewords in an inner layer.

5. The method of claim 2, wherein an output bit sequence of an inner layer of the third bits group is generated by applying the inner layer encoding scheme as follows:

$$\pi(u^{(k)}) = \left[0, \ldots, 0, u_1^{(k)}, \ldots, u_{|I_{(k)}|}^{(k)}, \tilde{u}_k^{(j_1)}, \ldots, \tilde{u}_k^{(j_{|X|})}, *, \ldots, *\right]$$

where the k is a polar code in the inner layer,
the * is a random bit,
the u is an input bit vector,
the $\pi(u)$ is a sequence of the input bit vectors,
the $u_j^{(k)}$, j=1, . . . , $|I_k|$ are secure bits which will be sent by the inner layer encoding scheme, and
the $|I_k|$ is mutual information of the k-th polar code.

6. The method of claim 1, wherein the generating the output bit sequence further comprises:
   generating, by the wireless communication device, the output bit sequence by applying a single layer polar coding scheme to the second bits group.

7. The method of claim 1, wherein the plurality of bits groups are arranged by the first mutual information in increasing order.

8. The method of claim 1, wherein the second predetermined value is a value derived by subtracting the first predetermined value from 1, and
   wherein the fourth predetermined value is a value derived by subtracting the third predetermined value from 1.

9. A device for providing a security communication, the device comprising:
   a transceiver configured to transmit and receive radio signals; and
   a processor operatively coupled with the transceiver and configured to:
   segment an input bit sequence into a plurality of bits groups based on first mutual information for a target receiver, second mutual information for an eavesdropper, and a plurality of predetermined values;
   generate an output bit sequence by applying a polar code scheme to each of the plurality of bits groups; and
   control the transceiver to transmit the output bit sequence to a target receiver,
   wherein the plurality of bits groups includes a first bits group, a second bits group, a third bits group and a fourth bits group,
   wherein the first bits group includes bit channels of which the first mutual information is smaller than a first predetermined value,
   wherein the second bits group includes bit channels of which the first mutual information is greater than the first predetermined value, and the second mutual information is smaller than a third predetermined value,
   wherein the third bits group includes bit channels of which the second mutual information is greater than the third predetermined value, and the second mutual information is smaller than a fourth predetermined value,
   wherein the fourth bits group includes bit channels of which the first mutual information is greater than a second predetermined value, and the second mutual information is greater than the fourth predetermined value, and wherein the processor generates the output bit sequence by applying a double layer polar coding scheme to the third bits group, which provides lower transmission delay and enhances transmission power optimization.

10. The device of claim 9, wherein the double layer polar coding scheme is divided into an inner layer encoding scheme and an outer layer encoding scheme.

11. The device of claim 10, wherein an output bit sequence of an outer layer of the third bits group is generated by applying the outer layer encoding scheme as follows:

$$\tilde{\pi}(v^{(j)}) = \left[0, \ldots, 0, v_1^{(j)}, \ldots, v_{|I_0^{(j)}|}^{(j)}, *, \ldots, *\right]$$

where the j is a polar code in the outer layer,
the * is a random bit,
the v is an input bit vector,
the $\tilde{\pi}(v)$ is a sequence of the input bit vectors,
the $$\left\{v_1^{(j)}, \ldots, v_{|I_0^{(j)}|}^{(j)}\right\}$$

are secure bits which will be sent by the outer layer encoding scheme, and
the $|I_0^{(j)}|$ is mutual information for the j-th polar code.

12. The device of claim 11, wherein a coded bit using the j-th polar code in the outer layer is mapped with a j-th bit in the bits group corresponding to all of codewords in an inner layer.

13. The device of claim 10, wherein an output bit sequence of an inner layer of the third bits group is generated by applying the inner layer encoding scheme as follows:

$$\pi(u^{(k)}) = \left[0, \ldots, 0, u_1^{(k)}, \ldots, u_{|I(k)|}^{(k)}, \tilde{u}_k^{(j_1)}, \ldots, \tilde{u}_k^{(j|X|)}, *, \ldots, *\right]$$

where the k is a polar code in the inner layer,
the * is a random bit,
the u is an input bit vector,
the $\pi(u)$ is a sequence of the input bit vectors,
the $u_j^{(k)}$, j=1, ..., $|I_k|$ are secure bits which will be sent by the inner layer encoding scheme, and
the $|I_k|$ is mutual information of the k-th polar code.

14. The device of claim 9, wherein the processor generates the output bit sequence by applying a single layer polar coding scheme to the second bits group.

15. The device of claim 9, wherein the plurality of bits groups are arranged by the first mutual information in increasing order.

16. The device of claim 9, wherein the second predetermined value is a value derived by subtracting the first predetermined value from 1, and
wherein the fourth predetermined value is a value derived by subtracting the third predetermined value from 1.

* * * * *